（12）United States Patent
Xiu et al.

(10) Patent No.: US 11,558,633 B2
(45) Date of Patent: Jan. 17, 2023

(54) SUB-BLOCK MOTION DERIVATION AND DECODER-SIDE MOTION VECTOR REFINEMENT FOR MERGE MODE

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 59 days.

(21) Appl. No.: 16/761,039

(22) PCT Filed: Nov. 1, 2018

(86) PCT No.: PCT/US2018/058719
§ 371 (c)(1),
(2) Date: May 1, 2020

(87) PCT Pub. No.: WO2019/089933
PCT Pub. Date: May 9, 2019

(65) Prior Publication Data
US 2021/0185338 A1  Jun. 17, 2021

Related U.S. Application Data

(60) Provisional application No. 62/690,661, filed on Jun. 27, 2018, provisional application No. 62/678,576, (Continued)

(51) Int. Cl.
*H04N 19/51* (2014.01)
*H04N 19/105* (2014.01)
(Continued)

(52) U.S. Cl.
CPC ........... *H04N 19/51* (2014.11); *H04N 19/105* (2014.11); *H04N 19/174* (2014.11); *H04N 19/176* (2014.11); *H04N 19/70* (2014.11)

(58) Field of Classification Search
CPC ...... H04N 19/51; H04N 19/52; H04N 19/174; H04N 19/176
See application file for complete search history.

(56) References Cited

U.S. PATENT DOCUMENTS

| 2005/0152452 A1* | 7/2005 | Suzuki | H04N 19/513 375/240.16 |
| 2014/0044171 A1* | 2/2014 | Takehara | H04N 19/176 375/240.14 |

(Continued)

OTHER PUBLICATIONS

M. Li, K. Chono and S. Goto, "Low-complexity merge candidate decision for fast HEVC encoding," 2013 IEEE International Conference on Multimedia and Expo Workshops (ICMEW), 2013, pp. 1-6, doi: 10.1109/ICMEW.2013.6618409. (Year: 2013).*

(Continued)

*Primary Examiner* — Jeremiah C Hallenbeck-Huber
(74) *Attorney, Agent, or Firm* — Condo Roccia Koptiw LLP

(57) ABSTRACT

Systems, methods, and instrumentalities for sub-block motion derivation and motion vector refinement for merge mode may be disclosed herein. Video data may be coded (e.g., encoded and/or decoded). A collocated picture for a current slice of the video data may be identified. The current slice may include one or more coding units (CUs). One or more neighboring CUs may be identified for a current CU. A neighboring CU (e.g., each neighboring CU) may correspond to a reference picture. A (e.g., one) neighboring CU may be selected to be a candidate neighboring CU based on the reference pictures and the collocated picture. A motion vector (MV) (e.g., collocated MV) may be identified from (Continued)

the collocated picture based on an MV (e.g., a reference MV) of the candidate neighboring CU. The current CU may be coded (e.g., encoded and/or decoded) using the collocated MV.

20 Claims, 18 Drawing Sheets

Related U.S. Application Data filed on May 31, 2018, provisional application No. 62/623,001, filed on Jan. 29, 2018, provisional application No. 62/580,184, filed on Nov. 1, 2017.

(51) Int. Cl.
*H04N 19/174* (2014.01)
*H04N 19/176* (2014.01)
*H04N 19/70* (2014.01)

(56) References Cited

U.S. PATENT DOCUMENTS

| | | | | |
|---|---|---|---|---|
| 2014/0241436 | A1* | 8/2014 | Laroche | H04N 19/109 375/240.16 |
| 2014/0355688 | A1* | 12/2014 | Lim | H04N 19/52 375/240.16 |
| 2015/0085929 | A1 | 3/2015 | Chen et al. | |
| 2015/0139329 | A1* | 5/2015 | Nakamura | H04N 19/159 375/240.16 |
| 2016/0219278 | A1 | 7/2016 | Chen et al. | |
| 2016/0234492 | A1* | 8/2016 | Li | H04N 19/82 |
| 2017/0223350 | A1* | 8/2017 | Xu | H04N 19/139 |
| 2017/0332099 | A1* | 11/2017 | Lee | H04N 19/122 |
| 2018/0007395 | A1* | 1/2018 | Ugur | H04N 21/4384 |
| 2018/0070100 | A1* | 3/2018 | Chen | H04N 19/174 |
| 2018/0084260 | A1* | 3/2018 | Chien | H04N 19/44 |
| 2018/0098072 | A1* | 4/2018 | Zhang | H04N 19/426 |
| 2019/0182505 | A1* | 6/2019 | Chuang | H04N 19/119 |
| 2019/0222837 | A1* | 7/2019 | Lee | H04N 19/126 |
| 2020/0045307 | A1* | 2/2020 | Jang | H04N 19/70 |

OTHER PUBLICATIONS

"JEM-7.0 Reference Software", Available at <https://jvet.hhi.fraunhofer.de/svn/svn_HMJEMSoftware/tags/HM-16.6-JEM-7.0>, 1 page.

Alshin, et al., "AHG6: on Bio Memory Bandwidth", JVET-D0042, Samsung Electronics Ltd., Joint Video Exploration Team (JVET) of ITU-T SG 16 WP 3 and ISO/IEC JTC 1/SC 29/WG 11, 4th Meeting, Chengdu, CN, Oct. 15-21, 2016, pp. 1-5.

Alshina, et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.

Bross, et al., "High Efficiency Video Coding (HEVC) Text Specification Draft 8", JCTVC-J1003, Editor, Joint Collaborative Team on Video Coding (JCT-VC) of ITU-T SG16 WP3 and ISO/IEC JTC1/SC29/WG11, 10th Meeting, Stockholm, SE, Jul. 11-20, 2012, 294 pages.

Chen, et al., "Algorithm Description of Joint Exploration Test Model 7 (JEM 7)", JVET-G1001-V1, Editors, Joint Video Exploration Team (JVET) of ITU-T Sg 16 WP 3 and ISO/IEC JTC 1/SC 29/WG 11, 7th Meeting, Torino, IT, Jul. 13-21, 2017, 50 pages.

Chen, et al., "Coding Tools Investigation for Next Generation Video Coding", Qualcomm Incorporated, COM 16-C 806-E, Jan. 2015, pp. 1-7.

ITU-T, "Advance Video Coding for Generic Audiovisual Services", H.264, Series H: Audiovisual and Multimedia Systems, Infrastructure of Audiovisual Services—Coding of Moving Video, Nov. 2007, 564 pages.

Karczewicz, et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting, Warsaw, Poland, Jun. 19-26, 2015, 2 pages.

Ohm, et al., "Report of AHG on Future Video Coding Standardization Challenges", AHG, ISO/IEC JTC1/SC29/WG11 MPEG2014/M36782, Warsaw, Poland, Jun. 2015, 4 pages.

SMPTE, "VC-1 Compressed Video Bitstream Format and Decoding Process", SMPTE 421M, Apr. 2006, 493 pages.

Tourapis, et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting, London, UK, Jun. 28-Jul. 3, 2009, 90 pages.

Wikipedia, "SIMD", Available at <https://en.wikipedia.org/wiki/SIMD>, pp. 1-8.

Xiu, et al., "Description of SDR, HDR and 360° Video Coding Technology Proposal by InterDigital Communications and Dolby Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting, San Diego, US, Apr. 10-20, 2018, 82 pages.

* cited by examiner

SUB-BLOCK MOTION DERIVATION AND DECODER-SIDE MOTION VECTOR REFINEMENT FOR MERGE MODE

CROSS-REFERENCE TO RELATED APPLICATIONS

This application is the National Stage Entry under 35 U.S.C. § 371 of Patent Cooperation Treaty Application No. PCT/US2018/058719, filed Nov. 1, 2018, which claims the benefit of U.S. Provisional Application Ser. No. 62/580,184, filed Nov. 1, 2017, U.S. Provisional Application Ser. No. 62/623,001, filed Jan. 29, 2018, U.S. Provisional Application Ser. No. 62/678,576, filed May 31, 2018, and U.S. Provisional Application Ser. No. 62/690,661, filed Jun. 27, 2018, the contents of which are incorporated by reference herein.

BACKGROUND

Video coding systems may be used to compress digital video signals, e.g., to reduce the storage and/or transmission bandwidth needed for such signals. Video coding systems may include block-based, wavelet-based, and/or object-based systems. A block-based hybrid video coding system may be deployed.

SUMMARY

Systems, methods, and instrumentalities for sub-block motion derivation and motion vector refinement for merge mode may be disclosed herein. Video data may be coded (e.g., encoded and/or decoded). A collocated picture for a current slice of the video data may be identified. The collocated picture may be identified based on a collocated picture indication, for example in a slice header. The current slice may include one or more coding units (CUs). One or more neighboring CUs may be identified for a current CU. A neighboring CU (e.g., each neighboring CU) may correspond to a reference picture. A (e.g., one) neighboring CU may be selected to be a candidate neighboring CU based on the reference pictures of the neighboring CUs and the collocated picture. A motion vector (MV) (e.g., collocated MV) may be identified from the collocated picture based on an MV (e.g., a reference MV) of the candidate neighboring CU. The collocated MV may be a temporal MV, and the reference MV may be a spatial MV. The current CU may be coded (e.g., encoded and/or decoded) using the collocated MV.

A neighboring CU may be selected to be the candidate neighboring CU based on respective temporal differences between the reference pictures of the neighboring CUs and the collocated picture. For example, a reference picture (e.g., each reference picture) may be associated with a picture order count (POC) and a neighboring CU that has a lowest POC difference from the collocated picture may be selected. The selected neighboring CU may have a reference picture that is the same as the collocated picture. The neighboring CU having a reference picture that is the same as the collocated picture may be selected without further consideration of other neighboring CUs.

Temporal scaling may be performed on the reference MV, for example if the reference picture of the candidate neighboring CU is not the same as the collocated picture. For example, the reference MV may be multiplied by a scaling factor. The scaling factor may be based on a temporal difference between the reference picture of the candidate neighboring CU and the collocated picture.

The collocated picture may include one or more collocated blocks. One or more of the collocated blocks may be valid collocated blocks. The valid collocated block may be contiguous and may form a valid collocated block region. The region may be identified, for example based on the current slice. The collocated MV may be associated with a first collocated block that may be valid or not valid. If the first collocated block is not valid, a second collocated block that is valid may be selected. The collocated MV from the first collocated block may be replaced with a second collocated MV associated with the second collocated block. The second collocated MV may be used to code (e.g., encode and/or decode) the current CU. The second collocated block may be selected based on, for example, the second collocated block having a lowest distance to the first collocated block. For example, the second collocated block may be the valid block that is closest to the first collocated block.

The current CU may be subdivided into one or more sub-blocks. A sub-block (e.g., each sub-block) may correspond to a reference MV. A collocated MV may be identified from the collocated picture for a sub-block (e.g., each sub-block) based on the reference MV for the sub-block. A size of the sub-blocks may be determined based on a temporal layer of the current CU.

DETAILED DESCRIPTION

Figure 1A:
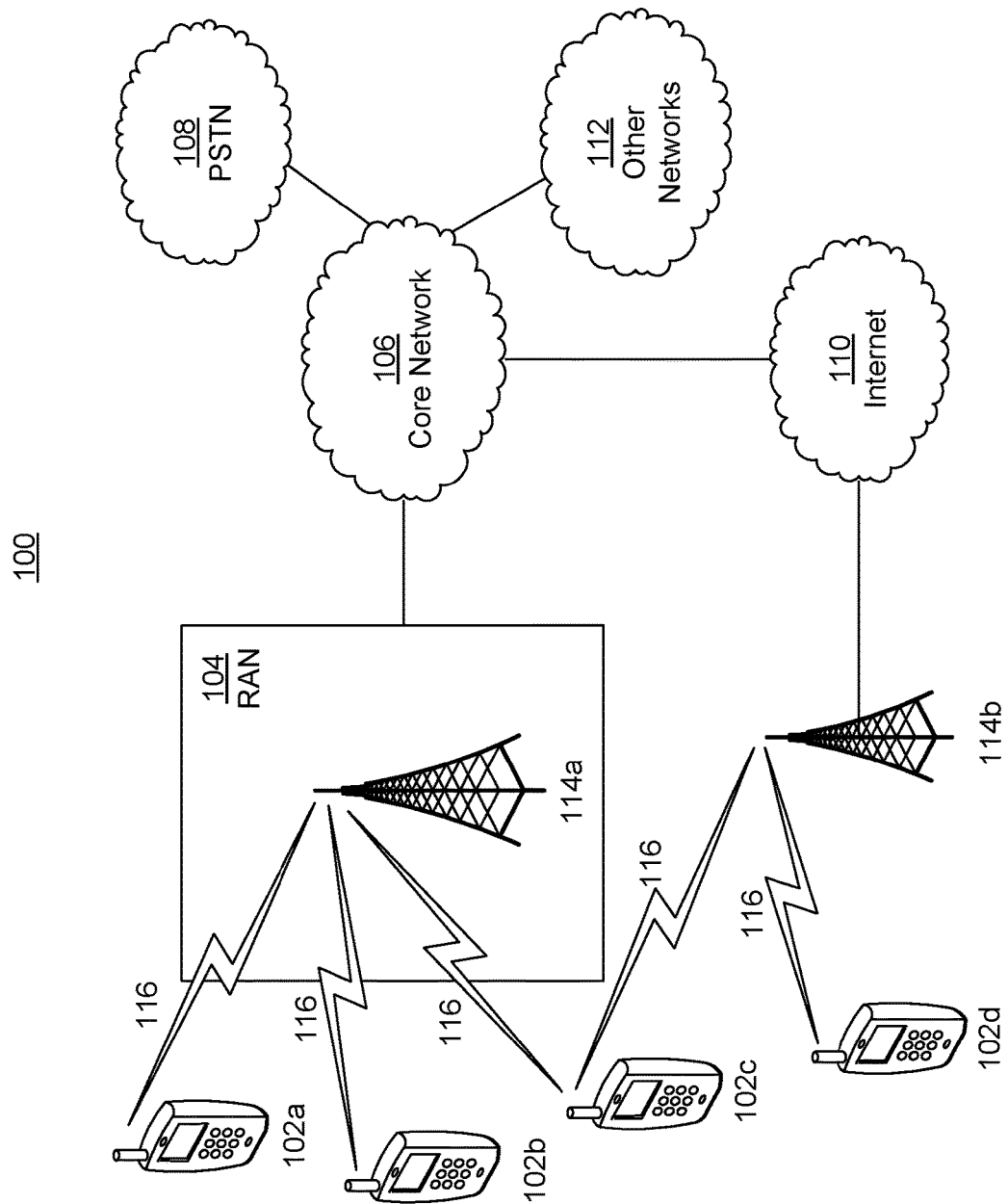
FIG. 1A is a system diagram illustrating an example communications system.

A more detailed understanding may be had from the following description, given by way of example in conjunction with the accompanying drawings wherein:

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
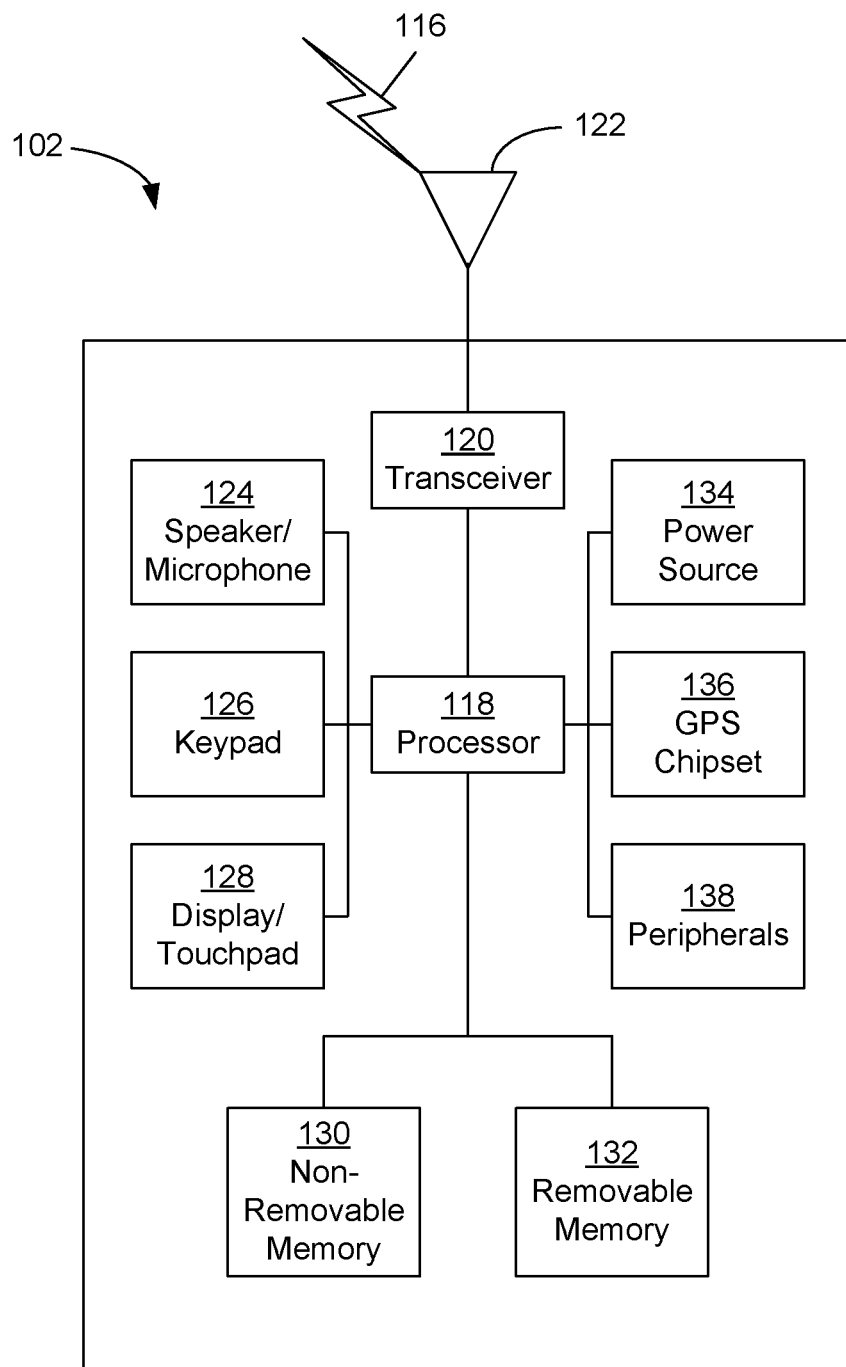
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118).

In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
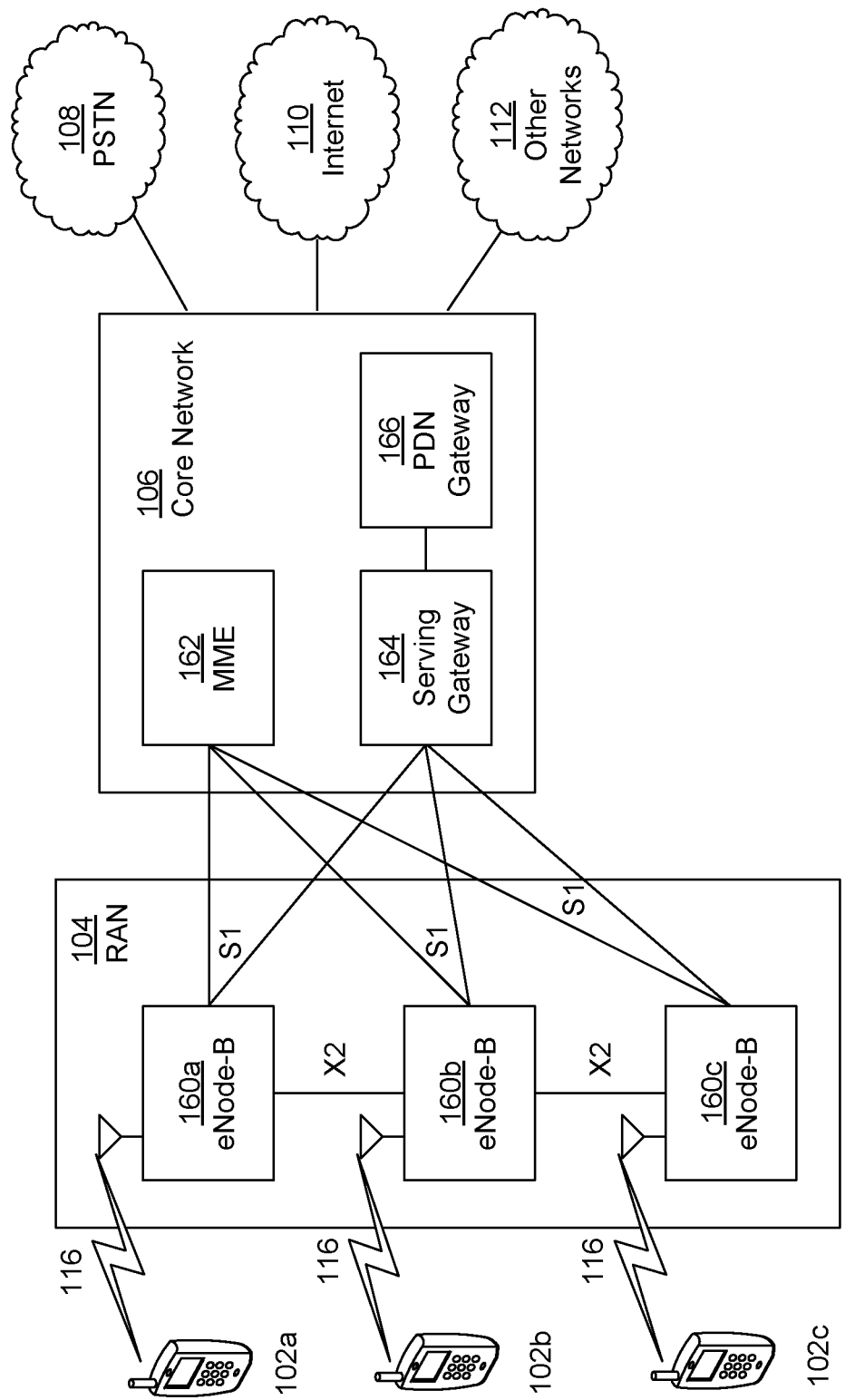
FIG. 1C is a system diagram illustrating an example radio access network (RAN) and an example core network (CN) that may be used within the communications system illustrated in FIG. 1A.

FIG. 1C is a system diagram illustrating an example RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanently) wired communication interfaces with the communication network.

In examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
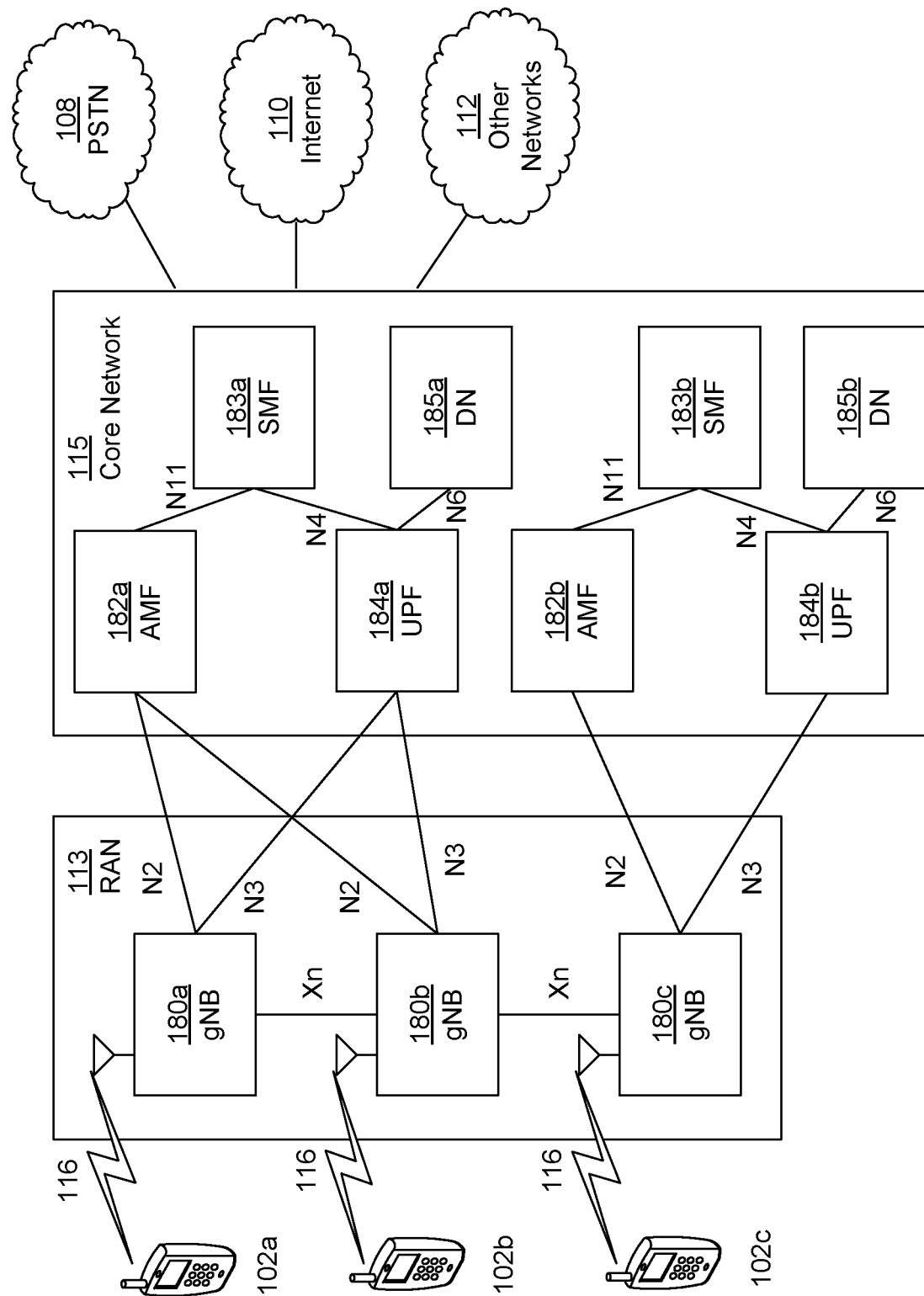
FIG. 1D is a system diagram illustrating a further example RAN and a further example CN that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
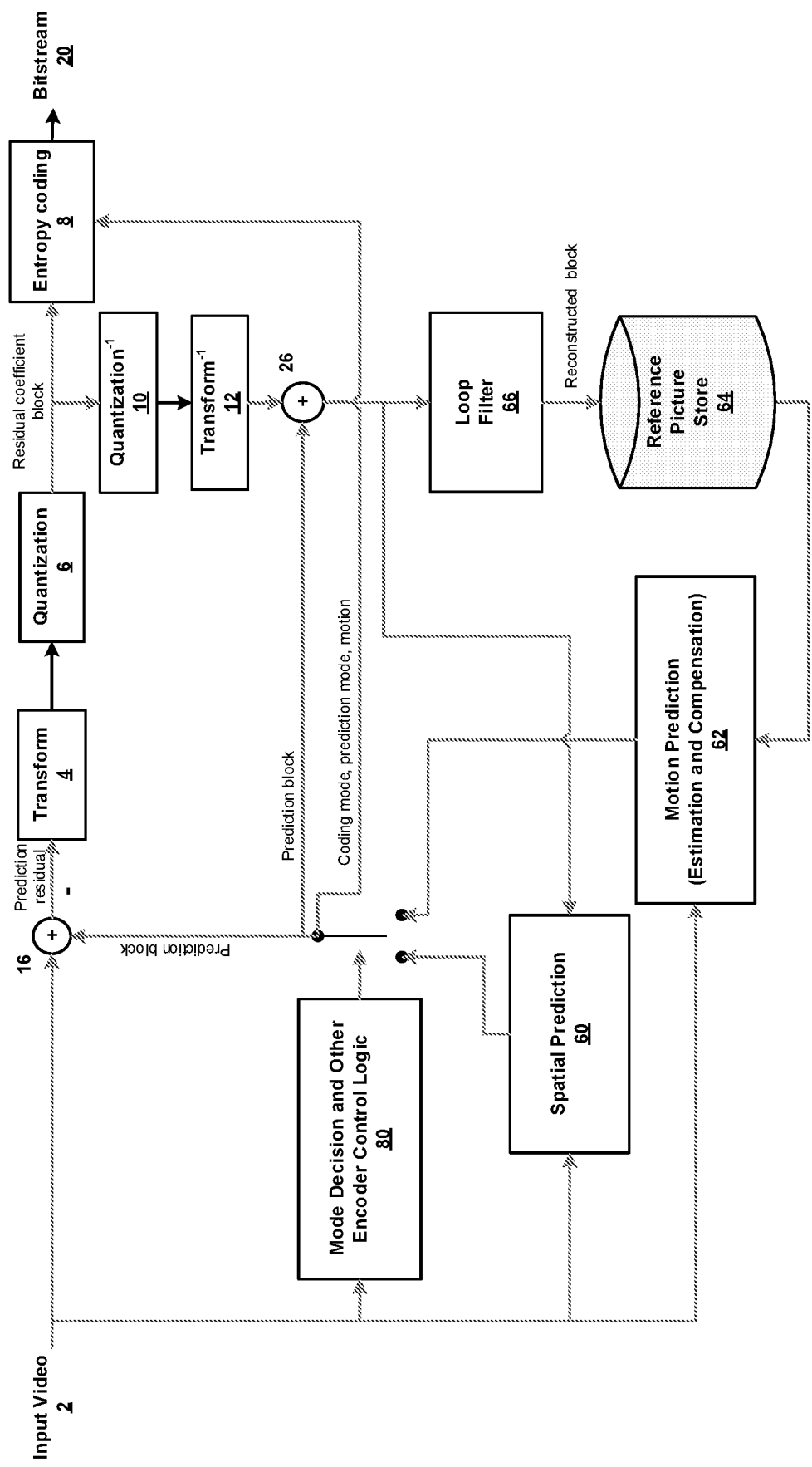
FIG. 2 shows an example diagram of block-based video encoder.

A block-based hybrid video coding framework may be provided. FIG. 2 gives a block diagram of an example block-based hybrid video encoding framework. The input video signal 2 may be processed block by block. Block sizes (e.g., extended block sizes, such as a coding unit (CU)) may compress high resolution (e.g., 1080p and beyond) video signals. For example, a CU may include 64×64 pixels. A CU may be partitioned into prediction units (PUs), for which separate predictions may be used. For an (e.g., each) input video block (e.g., MB and/or CU), spatial prediction 60 and/or temporal prediction 62 may be performed. Spatial prediction (e.g., intra prediction) may use pixels from samples of coded neighboring blocks (e.g., reference samples) in the video picture/slice to predict the current video block. Spatial prediction may reduce spatial redundancy, for example, that may be inherent in the video signal. Temporal prediction (inter prediction and/or motion compensated prediction) may use reconstructed pixels from the coded video pictures, for example, to predict the current video block. Temporal prediction may reduce temporal redundancy, for example, that may be inherent in the video signal. Temporal prediction signals for a video block may be signaled by one or more motion vectors (MVs). The MVs may indicate the amount and/or the direction of motion between the current block and the current block's reference block. If multiple reference pictures are supported for a (e.g., each) video block, the video block's reference picture index may be sent. The reference index may be used to identify from which reference picture in the reference picture store 64 the temporal prediction signal derives. After spatial and/or temporal prediction, the mode decision block 80 in the encoder may determine a prediction mode (e.g., the best prediction mode), for example, based on a rate-distortion optimization. The prediction block may be subtracted from the current video block 16. The prediction residual may be de-correlated using transform 4 and/or quantization 6. The quantized residual coefficients may be inverse quantized 10 and/or inverse transformed 12, for example, to form the reconstructed residual. The reconstructed residual may be added to the prediction block 26, for example, to form the reconstructed video block. In-loop filtering (e.g., a de-blocking filter and/or Adaptive Loop Filters) may be applied 66 on a reconstructed video block before the reconstructed video block is put in the reference picture store 64 and/or used to code video blocks (e.g., future video blocks). To form the output video bit-stream 20, a coding mode (e.g., inter or intra), prediction mode information, motion information, and/or quantized residual coefficients may be sent (e.g., may all be sent) to the entropy coding unit 8, for example, to be compressed and/or packed to form the bit-stream.

Figure 3:
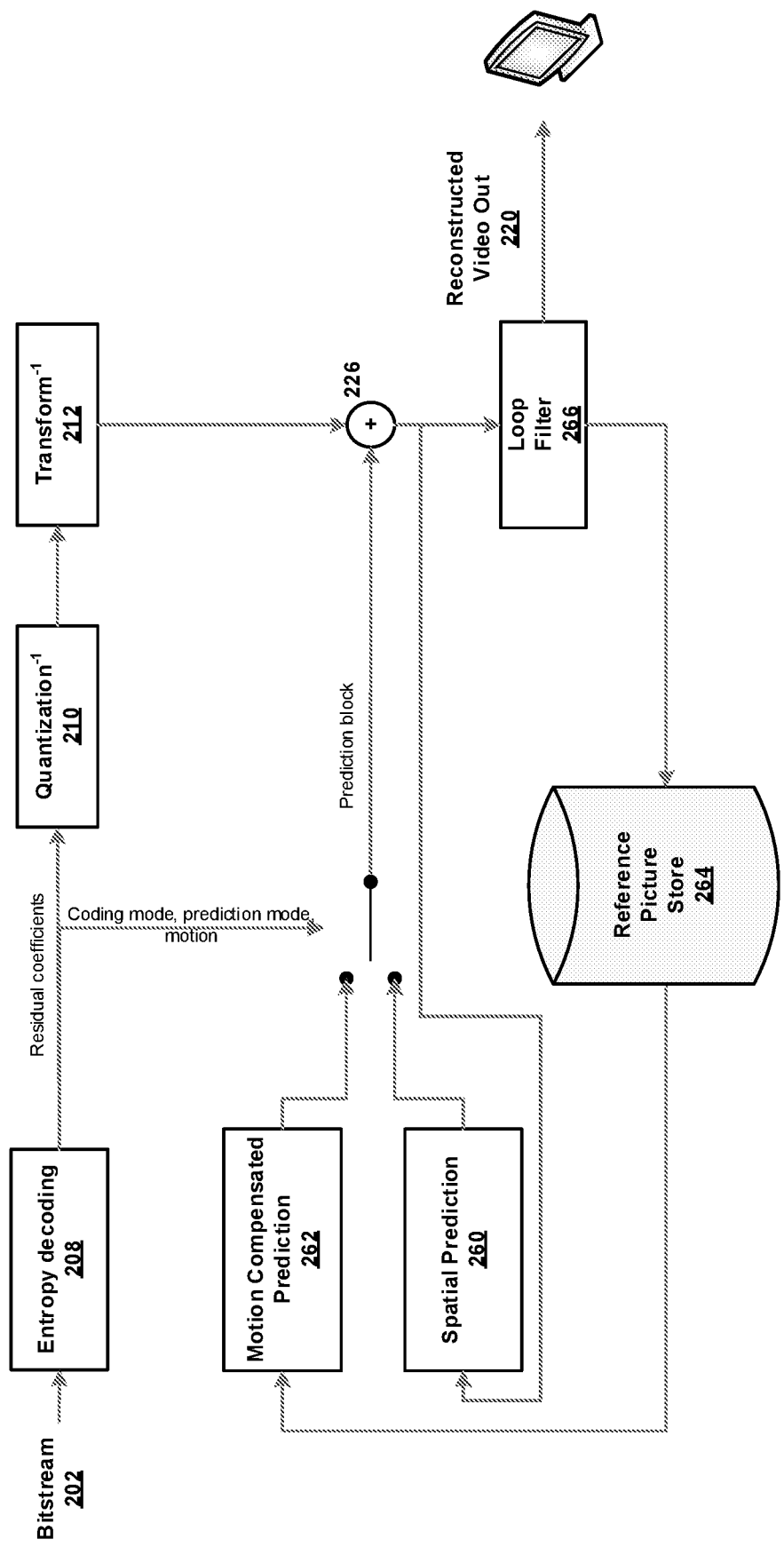
FIG. 3 shows an example block diagram of video decoder.

FIG. 3 shows a block diagram of an example block-based video decoder. The video bit-stream 202 may be unpacked (e.g., first unpacked) and/or entropy decoded at entropy decoding unit 208. The coding mode and prediction information may be sent to the spatial prediction unit 260 (e.g., if intra coded) and/or to the temporal prediction unit 262 (e.g., if inter coded) to form the prediction block. The residual transform coefficients may be sent to inverse quantization unit 210 and/or to inverse transform unit 212, e.g., to reconstruct the residual block. The prediction block and the residual block may be added together at 226. The reconstructed block may go through in-loop filtering, for example, before the reconstructed block is stored in reference picture store 264. The reconstructed video in the reference picture store may be sent to drive a display device and/or used to predict video blocks (e.g., future video blocks).

In motion compensated prediction, for a (e.g., each) inter-coded block, motion information (e.g., motion vector (MV) and reference picture index) may be used to trace the corresponding matching block in the corresponding reference picture, for example, which may be synchronized by the encoder and/or the decoder. Two modes (e.g., merge mode and non-merge mode) may be used to code the motion information of an inter block. If a block is coded by non-merge mode, the MV may be coded (e.g., differentially coded) using a MV predictor. The difference between the MV and the MV predictor may be transmitted to the decoder. For a (e.g., each) block that is coded by merge mode, the motion information of the block may be derived from spatial and/or temporal neighboring blocks. A competition based scheme may be applied, for example, to select a neighboring block (e.g., the best neighboring block) out of the available candidates. The index (e.g., only the index) of a candidate (e.g., the best candidate) may be sent for re-establishing the motion information (e.g., the same motion information) at the decoder.

Figure 4:
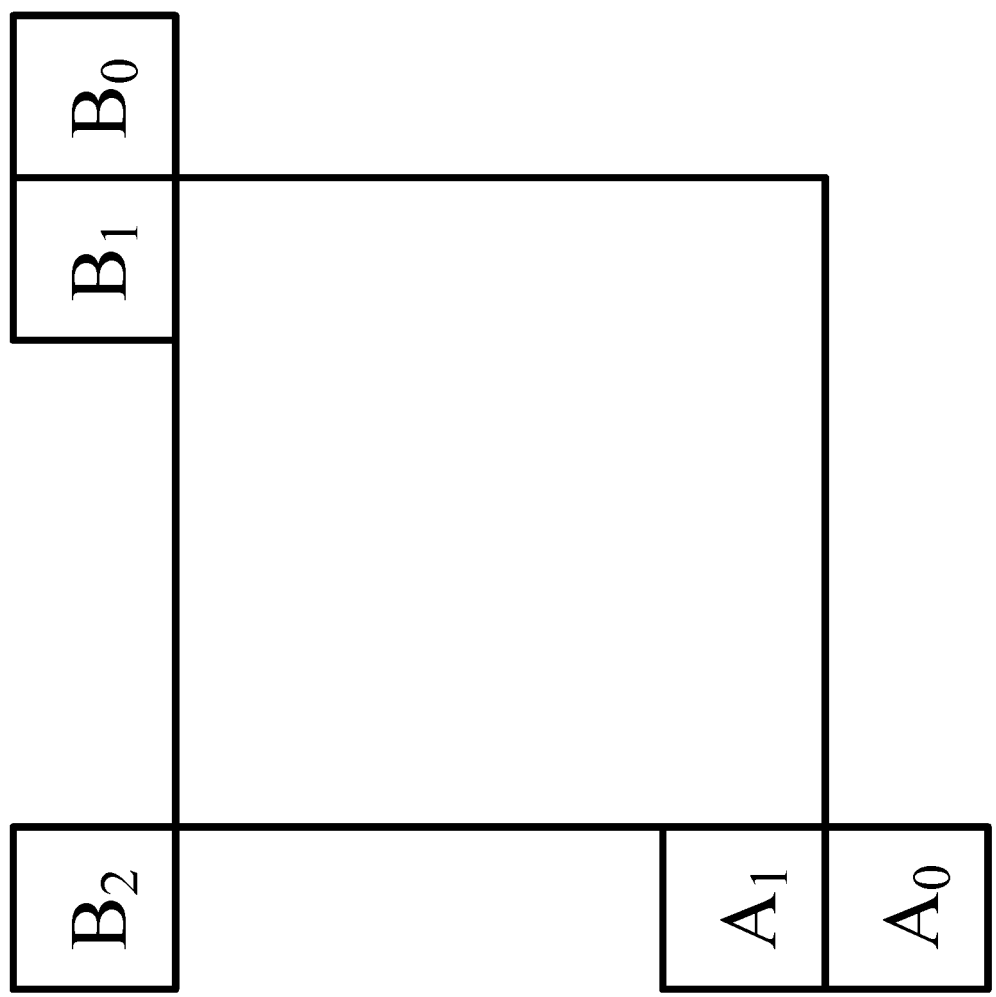
FIG. 4 shows example spatial merge candidates.

Merge mode may be performed. Candidates (e.g., a set of candidates) in the merge mode may be composed of one or more spatial neighboring candidates, for example, a temporal neighboring candidate and one or more generated candidates. FIG. 4 shows example positions of spatial candidates. To construct the list of merge candidates, the spatial candidates may be checked and/or added to the list, for example, in the order A1, B1, B0, A0 and B2. If the block located at a spatial position is intra-coded and/or outside the boundary of the current slice, the block may be unavailable. To reduce the redundancy of the spatial candidates, redundant entries (e.g., entries in which candidates have the same motion information as an existing candidate) may be excluded from the list. After including the valid spatial candidates, a temporal candidate may be generated from the motion information of the co-located block in the co-located reference picture by temporal motion vector prediction (TMVP). The size of the merge candidate list (e.g., N) may be set. For example, N may be 5. If the number of merge candidates (e.g., including spatial and temporal candidates) is larger than N, the first N−1 spatial candidates and/or the temporal candidate may be kept in the list. For example, (e.g., only) the first N−1 spatial candidates and the temporal candidate may be kept in the list. If the number of merge candidates is smaller than N, one or more candidates (e.g., combined candidates and zero candidates) may be added to the candidate list, for example, until the number of merge candidates reaches N.

One or more candidates may be included in the merge candidate list. For example, the five spatial candidates as shown in FIG. 4 and the TMVP candidate may be included in the merge candidate list. One or more aspects of the motion derivation for the merge mode may be modified, for example, including sub-block-based motion derivation and decoder-side motion vector refinement.

Sub-block-based motion derivation for merge mode may be performed. A (e.g., each) merge block may include a set of motion parameters (e.g., a motion vector and a reference picture index) for a (e.g., each) prediction direction. One or more (e.g., two) merge candidates that may enable the derivation of motion information at sub-block level may be included in the merge candidate list. Including the merge candidates with sub-block level motion information in the merge candidate list may be achieved by increasing the maximum size (e.g., N) of the merge candidate list, for example, from 5 to 7. When one or more of the candidates are selected, the encoder/decoder may split the CU (e.g., the current CU) into 4×4 sub-blocks and may derive the motion information for a (e.g., each) sub-block. Advanced temporal motion vector prediction (ATMVP) may be used. For example, ATMVP may split a CU into sub-blocks (e.g., 4×4 sub-blocks). ATMVP may be built upon TMVP and may allow a CU to obtain the motion information of the CU's sub-blocks from multiple small blocks from the temporal neighboring picture (e.g., collocated reference picture) of the current picture. In spatial-temporal motion vector prediction (STMVP), the motion parameters of the sub-blocks may be derived (e.g., recursively) by averaging the motion vectors of temporal neighbors with the motion vectors of the spatial neighbors.

Figure 5:
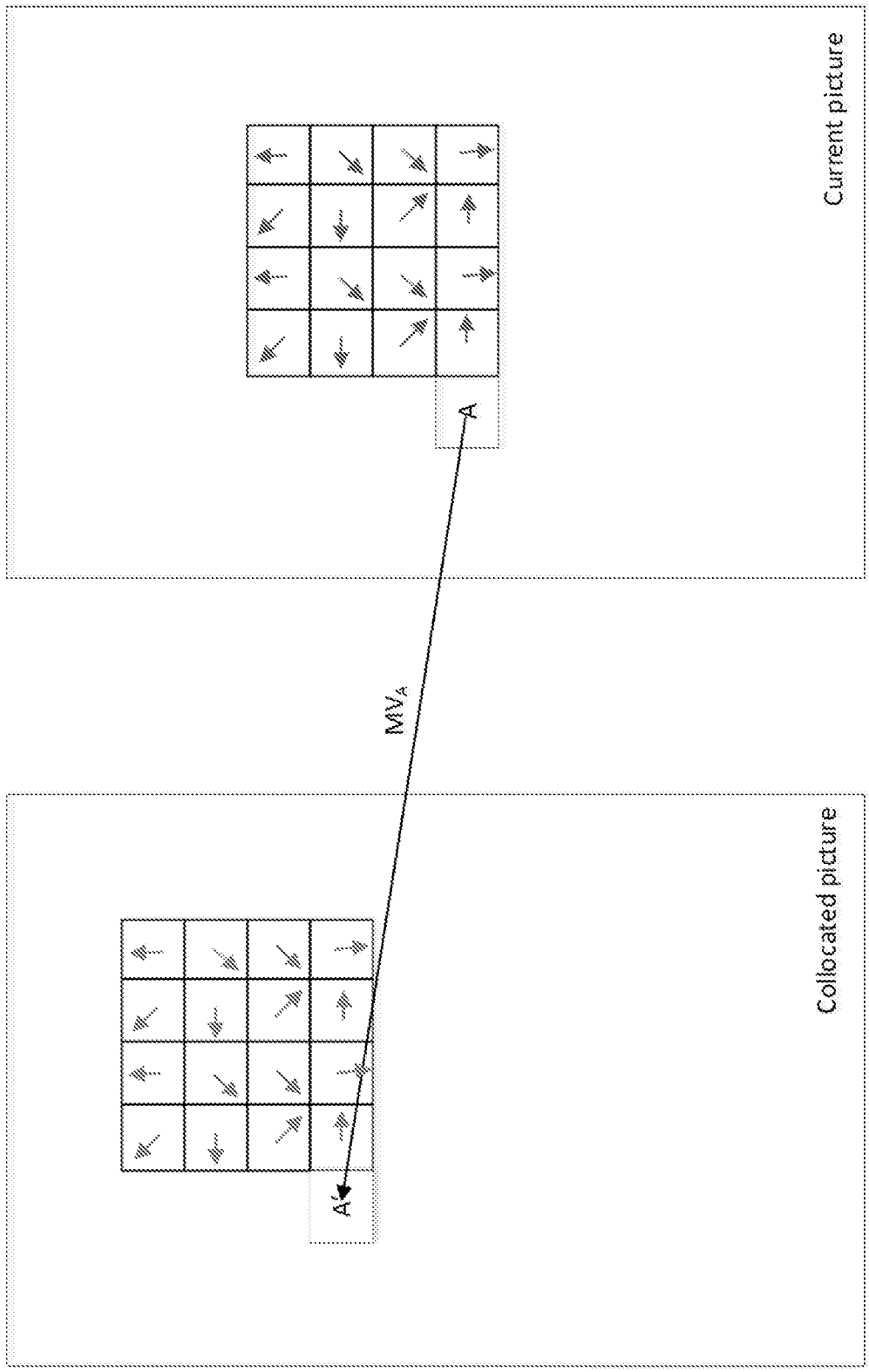
FIG. 5 shows an example of advanced temporal motion vector prediction.

Advanced temporal motion vector prediction may be performed. In ATMVP, a block may be allowed to derive multiple motion information (e.g., motion vector and/or reference indices) for the sub-blocks in the block from multiple smaller blocks of the temporal neighboring pictures of the current picture. For example, ATMVP may derive the motion information of sub-blocks of a block, as follows. The corresponding block of the current block (e.g., a collocated block) may be identified in a temporal reference picture. The selected temporal reference picture may be the collocated picture. The current block may be split into sub-blocks, and the motion information of a (e.g., each) sub-block may be derived from the corresponding small block in the collocated picture, as shown in FIG. 5.

The collocated block and/or the collocated picture may be identified by motion information of the spatial neighboring blocks of the current block. An available candidate (e.g., the first available candidate) in the merge candidate list may be considered. FIG. 5 shows an example of the available candidate in the merge candidate list being considered. Block A may be identified as an available (e.g., the first available) merge candidate of a block (e.g., the current block), for example, based on the scanning order of the merge candidate list. A motion vector (e.g., a corresponding motion vector) of block A (e.g., MVA) and/or block A's reference index may be used to identify the collocated picture and/or the collocated block. The location of the collocated block in the collocated picture may be determined by adding the motion vector of block A (e.g., MVA) to the coordinates of the current block.

For a (e.g., each) sub-block in a block (e.g., the current block), the motion information of the sub-block's corresponding small block (e.g., as indicated by arrows in FIG. 5) in the collocated block may be used to derive the motion information of the sub-block. For example, after the motion information of a (e.g., each) small block in the collocated block is identified, the motion information of the small block may be converted to the motion vector and/or reference index of the corresponding sub-block in the current block, for example, in the same way as the temporal motion vector prediction (TMVP), where temporal motion vector scaling may be applied.

Figure 6:
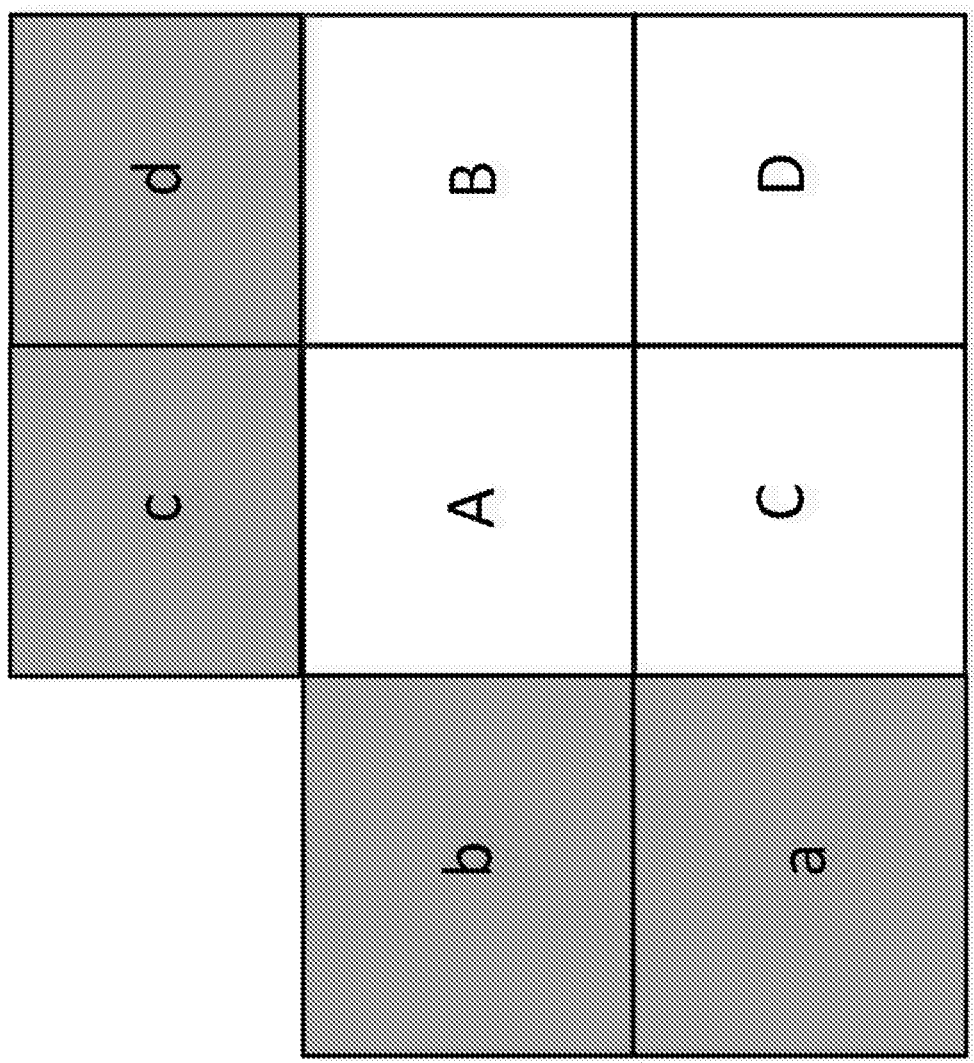
FIG. 6 shows an example of spatial-temporal motion vector prediction.

Spatial-temporal motion vector prediction (STVMP) may be performed. In STVMP, the motion information of the sub-blocks in a (e.g., one) coding block may be derived in a recursive manner. FIG. 6 shows an example of STVMP. For example, the current block may include one or more (e.g., four) sub-blocks, for example, A, B, C and D. The neighboring small blocks that are spatial neighbors to the current block may be labeled as a, b, c and d, respectively. The motion derivation for sub-block A may begin with identifying block A's spatial neighbors (e.g., two spatial neighbors). A neighbor (e.g., the first neighbor) of sub-block A may be the above neighbor c. If the small block c is not available or is not intra coded, the neighboring small blocks above the current block (e.g., from left to right) may be checked, for example, in order. A neighbor (e.g., the second neighbor) of sub-block A may be the left neighbor b. If the small block b is not available or is not intra coded, the neighboring small blocks to the left of the current block (e.g., from top to bottom) may be checked, for example, in order. After fetching the motion information of spatial neighbors, the motion information of temporal neighbor of sub-block A may be obtained in a similar (e.g., the same) manner as in TMVP. The motion information (e.g., all the motion information) of the available spatial and/or temporal neighbors (e.g., up to 3) may be averaged and/or used as the motion information of sub-block A. Based on the raster scan order, STMVP may be repeated, for example, to derive the motion information of sub-blocks (e.g., all the other sub-blocks) in the current video block.

Decoder-side motion vector refinement for regular merge candidates may be performed. For a merge mode, when the selected merge candidate is bi-predicted, the prediction signal of the current CU may be formed, for example, by averaging the two prediction blocks using the two MVs associated with the reference lists L0 and L1 of the candidate. The motion parameters of the spatial/temporal neighbors may be inaccurate and may not represent the true motion of the current CU. A decoder-side motion vector refinement (DMVR) may be applied to refine the MVs of the regular merge candidates that are bi-predicted. For example, when a conventional merge candidate is selected (e.g., a spatial merge candidate and/or TMVP merge candidate), a bi-prediction template may be generated (e.g., firstly generated) as the average, for example, based on the motion vectors from the reference list L0 and L1, respectively. The average may be a weighted average, for example when weighted prediction is enabled. Local motion refinement based on template-matching may be performed by DMVR around the initial MVs using the bi-prediction template, as described herein.

Figure 7:
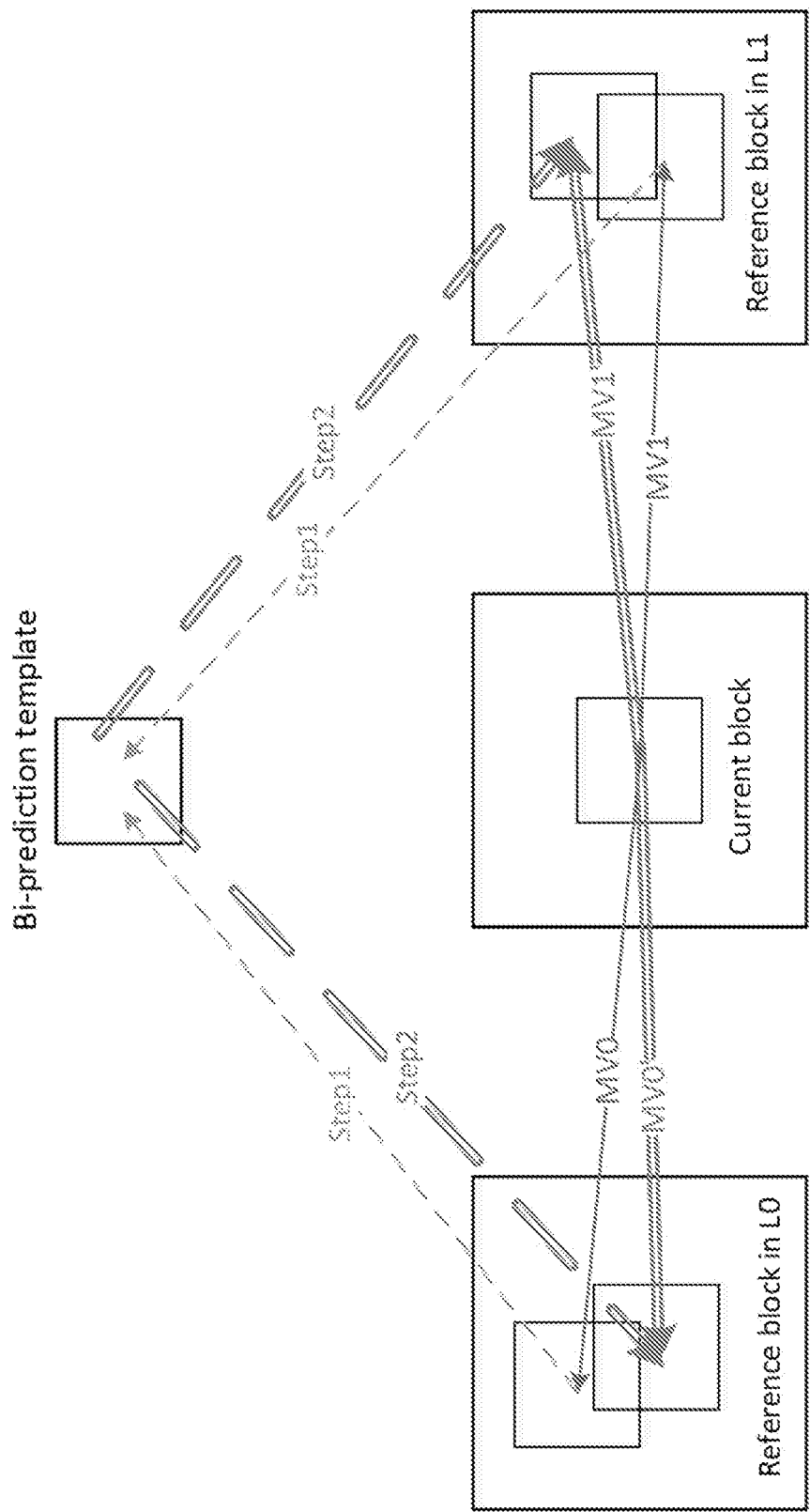
FIG. 7 shows an example decoder-side motion vector refinement (DMVR) for regular merge mode.

FIG. 7 shows an example motion refinement that may be applied in DMVR. DMVR may refine the MVs of a regular merge candidate, for example, as follows. As shown in FIG. 7, the bi-prediction template may be generated by averaging the prediction blocks (e.g., two prediction blocks) using the initial MVs in L0 and L1 (e.g., $MV_0$ and $MV_1$) of the merge candidate. For a (e.g., each) reference list (e.g., L0 or L1), a template-matching based motion search may be performed in the local region around the initial MVs. For a (e.g., each) motion vector (e.g., $MV_0$ or $MV_1$) of the corresponding reference list around the initial MV in the list, the cost values (e.g., sum of absolute difference (SAD)) between the bi-prediction template and the corresponding prediction blocks using the motion vector may be measured. For a prediction direction, the MV that minimizes the template cost in the prediction direction may be considered as the final MV in the reference list of the regular merge candidate. For a prediction direction, one or more (e.g., eight) neighboring MVs surrounding the initial MV (e.g., with one integer sample offset) may be considered during the motion refinement. The refined MVs (e.g., two refined MVs, such as $MV_0'$ and $MV_1'$, as shown in FIG. 7) may be used to generate the final bi-prediction signal of the current CU.

As described herein, the sub-block-based motion derivation (e.g., ATMVP and STMVP) and/or DMVR may enhance the efficiency of the merge mode, for example, by improving the granularity and/or the accuracy of the derived motion vectors.

For ATMVP and/or STMVP, the motion parameters of the current CU may be derived, for example, based on the granularity of 4×4 blocks. The motion derivation may be repeated, for example, to generate motion information (e.g., all the motion information) of the current CU. The reference samples may be obtained from the temporal reference pictures. The encoder/decoder may switch the memory access to one or more (e.g., different) regions inside the reference pictures.

A granularity (e.g., 4×4 block size) may be applied in ATMVP and/or STMVP, and may be used to derive the motion parameters of ATMVP/STMVP-coded CUs in one or more pictures. The motion of the video blocks in different pictures may display different characteristics. For example, based on the correlation between the current picture and the current picture's reference picture, video blocks in one or more pictures (e.g., the pictures at the high temporal layer of random access configuration) may display steady motion. The motion of video blocks in one or more pictures (e.g., the pictures at the low temporal layer of random access configuration) may be unstable. The granularity level for deriving the motion parameters of the ATMVP/STMVP-coded CUs may be adjusted, for example, depending on different pictures.

DMVR may be used to compensate for the motion inaccuracy, for example, caused by using the motion of the current CU's spatial/temporal neighbors. DMVR may be enabled for the CUs that are coded by the regular merge mode. When the motion parameters provided by the regular merge candidate are accurate, the improvements achieved by DMVR may be negligible. For example, DMVR may be skipped.

Signaling may support the picture/slice-level variation of the derivation granularities (e.g., sub-block size) for calculating the motion parameters of the ATMVP-coded CUs and/or the STMVP-coded CUs. The optimal granularity for the motion derivations of ATMVP and/or STMVP for the current picture may be determined.

An early termination may be performed for the motion derivation of DMVR-based merge mode. DMVR may be applied in a regular merge mode. Two or more prediction signals (e.g., two prediction signals) may be generated from the regular merge candidate. The similarity between the prediction signals may be measured, for example, to determine whether to skip DMVR.

The local motion refinement at the intermediate bit-depth may be conducted. A motion refinement of DMVR may be performed at the input bit-depth. Some bit-shifting and rounding operations (e.g., unnecessary bit-shifting and rounding operations) may be removed from DMVR.

Sub-block-based motion derivation based on ATMVP and STMVP may be performed. For ATMVP and/or STMVP, the motion derivation may be performed on a fixed granularity. The granularity may be signaled in sequence parameter set (SPS) as a syntax element syntax log 2_sub_pu_tmvp_size. The same derivation granularity may be applied to ATMVP and STMVP, and may be used to calculate the motion parameters of the ATMVP/STMVP-coded CUs in the pictures in the sequence.

The motion field generated by ATMVP and/or STMVP may provide different characteristics. As described herein, the motion parameters of the sub-blocks of an STMVP-coded CU may be recursively derived by averaging the motion information of the spatial and/or temporal neighbors of a (e.g., each) sub-block inside the CU based on the raster scan order. The motion parameters of an ATMVP-coded CU may be derived from the temporal neighbors of the sub-blocks within the CU. STMVP may lead to steady motion, and the motion parameters of the sub-blocks inside the CU may be consistent. Different granularities may be used to derive the motion parameters for ATMVP and STMVP.

ATMVP and/or STMVP may use the motion parameters of temporal neighbors in reference pictures, for example, to calculate the motion parameters of the current block. ATMVP and/or STMVP may provide motion estimation (e.g., reliable motion estimation) when there is a small motion between the current block and the current block's collocated block in the reference picture. For the blocks with small motion between the current block and the collocated block (e.g., the blocks in the highest temporal layer of random access (RA) configuration), the sub-block motion parameters generated by ATMVP and/or STMVP may be similar. For video blocks that show large motion from the collocated blocks (e.g., the blocks in the lowest temporal layer of RA configuration), the motion parameter calculated by ATMVP and/or STMVP for a (e.g., each) sub-block may deviate from that of the sub-block's spatial neighboring sub-blocks. The motion derivation may be performed on small sub-blocks. For example, a current coding unit (CU) may be subdivided into one or more sub-blocks, with a sub-block (e.g., each sub-block) corresponding to an MV (e.g., a reference MV). An MV (e.g., a collocated MV) may be identified from a collocated picture for a sub-block (e.g., each sub-block) based on the reference MV for that sub-block. The motion parameters may be derived at a one or more (e.g., different) granularities for ATMVP/STMVP-coded CUs from one or more (e.g., different) pictures. The derivation granularities (e.g., the size of the sub-blocks) may be selected (e.g., adaptively selected) for ATMVP and/or STMVP, for example, at the picture/slice-level. For example, the size of the sub-blocks may be determined based on a temporal layer of the current CU.

Signaling of the adaptively selected ATMVP/STMVP derivation granularity at a picture/slice-level may be performed. One or more (e.g., two) granularity flags may be signaled in the SPS. For example, a slice_atmvp_granularity_enabled_flag and/or a slice_stmvp_granularity_enabled_flag, may be signaled in SPS to indicate whether the derivation granularities of ATMVP and/or STMVP, respectively, may be adjusted at the slice-level.

A value (e.g., 1) may indicate that the corresponding ATMVP-/STMVP-based derivation granularity is signaled at the slice-level. A value (e.g., 0) may indicate that the corresponding ATMVP/STMVP derivation granularity is not signaled at the slice-level and that a syntax element (sps_log 2_subblk_atmvp_size0 or sps_log 2_subblk_stmvp_size) is signaled in the SPS, for example, to specify the corresponding ATMVP-/STMVP-based derivation granularity that may be used for the slices referring to the current SPS. Table 1 illustrates example syntax elements that may be signaled in SPS. The syntax elements in Table 1 may be used in other high-level syntax structures, such as video parameter set (VPS) and/or picture parameter set (PPS).

TABLE 1

The example syntax elements in SPS, separate control of ATMVP and STMVP

|  | Descriptor |
|---|---|
| sequence_parameter_set( ) { |  |
| ...... |  |
| slice_atmvp_granularity_enabled_flag | u(1) |
| if( !slice_atmvp_granularity_enabled_flag ) |  |
| sps_log2_subblk_atmvp_size | ue(v) |
| slice_stmvp_granularity_enabled_flag | u(1) |
| if( !slice_stmvp_granularity_enabled_flag ) |  |
| sps_log2_subblk_stmvp_size | ue(v) |
| ...... |  |
| } |  |

The parameter slice_atmvp_granularity_enabled_flag may specify the presence or absence of the syntax element slice_log 2_subblk_atmvp_size in the slice segment header of the slices referring to the SPS. For example, a value of 1 may indicate that syntax element slice_log 2_subblk_atmvp_size is present and a value of 0 may indicate that syntax element slice_log 2_subblk_atmvp_size is absent from the slice segment header of the slices referring to the SPS.

The parameter sps_log 2_subblk_atmvp_size may specify the value of the sub-block size that may be used for deriving the motion parameters for advanced temporal motion vector prediction for the slices referring to the SPS.

The parameter slice_stmvp_granularity_enabled_flag may specify the presence or absence of the syntax element slice_log 2_subblk_stmvp_size in the slice segment header of the slices referring to the SPS. For example, a value of 1 may indicate that syntax element slice_log 2_subblk_stmvp_size is present and a value of 0 may indicate that syntax element slice_log 2_subblk_stmvp_size is absent from the slice segment header of the slices referring to the SPS.

The parameter sps_log 2_subblk_stmvp_size may specify the value of the sub-block size that may be used for deriving the motion parameters for spatial-temporal motion vector prediction for the slices referring to the SPS.

In Table 1, the syntax elements sps_log 2_subblk_atmvp_size and sps_log 2_subblk_stmvp_size may be specified (e.g., specified once) and may be applied for a video sequence. One or more (e.g., different) values of sps_log 2_subblk_atmvp_size and sps_log 2_subblk_stmvp_size may be specified for pictures at one or more (e.g., different) temporal levels. For a current picture referring to the SPS, depending on the temporal level to which the current picture belongs, values of sps_log 2_subblk_atmvp_size and sps_log 2_subblk_stmvp_size may be determined and/or applied. The syntax elements sps_log 2_subblk_atmvp_size and sps_log 2_subblk_stmvp_size may be applied to sub-block units that are square shaped. The sub-block units may be rectangular. For example, if the sub-block units are rectangular, the sub-block width and height for ATMVP and/or STMVP may be specified.

The slice-level adaptation of the ATMVP-/STMVP-based derivation granularity may be enabled. For example, slice_atmvp_granularity_enabled_flag and/or slice_stmvp_granularity_enabled_flag in the SPS may be set to a value indicating the presence of a syntax element (e.g., 1). A syntax element may be signaled in the slice segment header of a (e.g., each) slice that refers to the SPS to specify the corresponding granularity level of the ATMVP-/STMVP-based motion derivation for the slice. For example, Table 2 illustrates example syntax elements that may be signaled in a slice segment header.

TABLE 2

The example syntax elements in slice segment header, separate control of ATMVP and STMVP

|  | Descriptor |
|---|---|
| slice_segment_header( ) { |  |
| ...... |  |
| if( slice_atmvp_granularity_enabled_flag ) |  |
| slice_log2_subblk_atmvp_size | ue(v) |
| if( slice_stmvp_granularity_enabled_flag ) |  |
| slice_log2_subblk_stmvp_size | ue(v) |
| ...... |  |
| } |  |

The parameter slice_log 2_subblk_atmvp_size may specify the value of the sub-block size that may be used for deriving the motion parameters for advanced temporal motion vector prediction for the current slice.

The parameter slice_log 2_subblk_stmvp_size may specify the value of the sub-block size that may be used for deriving the motion parameters for spatial-temporal motion vector prediction for the current slice.

As shown in Table 1 and Table 2, one or more (e.g., two) sets of syntax elements may be used to control (e.g., separately) the sub-block granularities of ATMVP-based and/or STMVP-based motion derivation. The sub-block granularities of ATMVP-based and/or STMVP-based motion derivation may be separately controlled, for example, when the characteristics (e.g., the motion regularity) of the motion parameters derived by ATMVP and/or STMVP are different. A set of syntax elements slice_atmvp_stmvp_granularity_enabled_flag and sps_log 2_subblk_atmvp_stmvp_size in SPS and slice_log 2_subblk_atmvp_stmvp_size in slice segment header may be signaled, for example, to control (e.g., jointly) the derivation granularities of ATMVP and/or STMVP at the sequence-level and the slice-level. Table 3 and Table 4 show example syntax changes in SPS and slice segment header, for example, when the sub-block granularities of the ATMVP- and STMVP-based motion derivation are adjusted (e.g., jointly).

TABLE 3

The example syntax elements in SPS, joint control of ATMVP and STMVP

|  | Descriptor |
|---|---|
| sequence_parameter_set( ) { |  |
| ...... |  |
| slice_atmvp_stmvp_granularity_enabled_flag | u(1) |
| if( !slice_atmvp_stmvp_granularity_enabled_flag ) |  |

TABLE 3-continued

The example syntax elements in SPS, joint control of ATMVP and STMVP

| | Descriptor |
|---|---|
| sps_log2_subblk_atmvp_stmvp_size | ue(v) |
| ...... | |
| } | |

The parameter slice_atmvp_stmvp_granularity_enabled_flag may specify the presence or absence of the syntax element slice_log 2_subblk_atmvp_stmvp_size in the slice segment header of the slices referring to the SPS. For example, a value of 1 may indicate that syntax element syntax element slice_log 2_subblk_atmvp_stmvp_size is present, and a value of 0 may indicate that syntax element slice_log 2_subblk_atmvp_stmvp_size is absent from the slice segment header of the slices referring to the SPS.

The parameter sps_log 2_subblk_atmvp_stmvp_size may specify the value of the sub-block size that may be used for deriving the motion parameters for ATMVP and/or STMVP for the slices referring to the SPS.

TABLE 4

Example syntax elements in slice segment header, joint control of ATMVP and STMVP

| | Descriptor |
|---|---|
| slice_segment_header( ) { | |
| ...... | |
| if( slice_atmvp_stmvp_granularity_enabled_flag ) | |
| slice_log2_subblk_atmvp_stmvp_size | ue(v) |
| ...... | |
| } | |

The parameter slice_log 2_subblk_atmvp_stmvp_size may specify the value of the sub-block size that may be used for deriving the motion parameters for advanced temporal motion vector prediction and/or spatial-temporal motion vector prediction for the current slice.

The sub-block granularities of ATMVP-/STMVP-based motion derivation at a picture/slice-level may be determined.

The granularity level of ATMVP-/STMVP-based motion derivation for a picture/slice may be determined based on, for example, the temporal layer of the picture/slice. As described herein, given the correlation between the pictures in the same video sequence, the ATMVP/STMVP derivation granularity may be similar to that of neighboring pictures of the picture/slice, for example, in the same temporal layer. For example, for the pictures in the highest temporal layer of the RA, ATMVP-/STMVP-based motion estimation may lead to large block partitions. The granularity value may be adjusted (e.g., to a larger value). For the pictures in the lowest temporal layer of the RA, the motion parameters derived by ATMVP and/or STMVP may be less accurate. The average size of the CUs that are coded by ATMVP and/or STMVP from the previous coded pictures may be used in the same temporal layer, for example, to calculate the sub-block granularity that may be used for the ATMVP-/STMVP-based motion derivation in the current picture. For example, the current picture may be the i-th picture in the k-th temporal layer. There may be M CUs in the current picture that may be coded by ATMVP and/or STMVP. If the M CUs are in size of $s_0, s_1, \ldots, s_{M-1}$, the average size of the ATMVP-/STMVP-coded CUs in the current picture, for example, $\sigma^k$, may be calculated as:

$$\sigma^k = \frac{\sum_{l=0}^{M-1} s_l}{M} \tag{1}$$

Based on Equation (1), when coding the (i+1)-th picture in the k-th temporal layer, the corresponding sub-block size $g_{i+1}^k$ of the ATMVP-/STMVP-based motion derivation may be determined by:

$$g_{i+1}^k = \begin{cases} 4, & \sigma^k < th_0 \\ 8, & th_0 \le \sigma^k < th_1 \\ 16 & \sigma^k \ge th_1 \end{cases} \tag{2}$$

Figure 8:
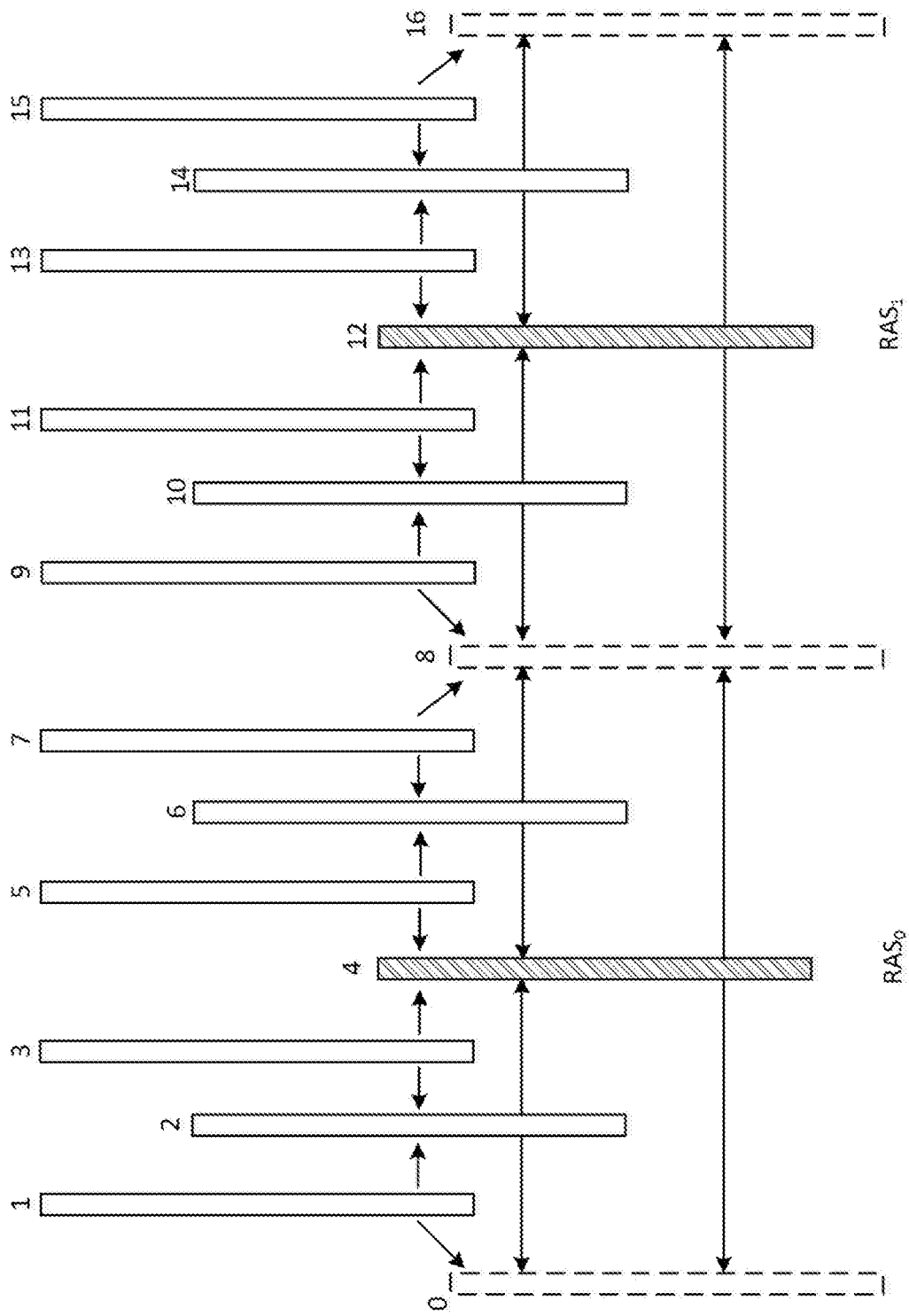
FIG. 8 shows an example refreshing of pictures, where the advanced temporal motion vector prediction/spatial-temporal motion vector prediction (ATMVP)/(STMVP) block-size statistics may be reset to 0 when adaptively determining the ATMVP/STMVP derivation granularity.

Parallel encoding may be supported for the RA configuration. When parallel encoding is enabled, the full-length sequence may be split into multiple independent random access segments (RASs), for example, which may span a shorter duration (e.g., around one second) of a sequence playback and a (e.g., each) video segment may be separately encoded. Neighboring RASs may be independent. The result of sequential coding (e.g., encoding the entire sequence frame by frame) may be the same as parallel encoding. When adaptive sub-block granularity derivation is applied (e.g., in addition to parallel encoding), a picture may be avoided, for example, using the ATMVP/STMVP block size information of the pictures from the previous RAS. For example, the value of $\sigma^k$ may be reset to 0 for one or more (e.g., all) the temporal layers (e.g., using the 4×4 sub-block) when encoding the first inter pictures in a RAS. FIG. 8 illustrates an example (e.g., where the intra period is equal to 8) to indicate the positions of the refreshing pictures where the ATMVP/STMVP block-size statistics may be reset to 0 when the parallel encoding is enabled. In FIG. 8, the blocks enclosed by dash lines and/or solid lines may represent intra pictures and inter pictures, respectively, and the pattern blocks may represent the refreshing pictures. Once calculated, the log 2( ) of $g_{i+1}^k$ values may be sent in the bitstream in the slice header, for example, according to the syntax in Table 1 and Table 2.

In an example, the sub-block size that is used for the ATMVP/STMVP-based motion derivation may be determined at the encoder and sent to the decoder. In an example, the sub-block size that is used for the ATMVP/STMVP-based motion derivation may be determined at the decoder. The adaptive determination of sub-block granularity may be used as decoder-side technology. For example, the ATMVP/STMVP block-size statistics (e.g., as indicated in Equation (1)) may be maintained during encoding and/or decoding, and may be used to synchronize the encoder and the decoder, for example, when the encoder and decoder determine the respective sub-block size for the ATMVP/STMVP-based motion derivation of a picture/slice, for example, using Equations (1) and (2). The values of $g_{i+1}^k$ may not be transmitted, for example if the ATMVP/STMVP block-size statistics are maintained during encoding and decoding.

Figure 9:
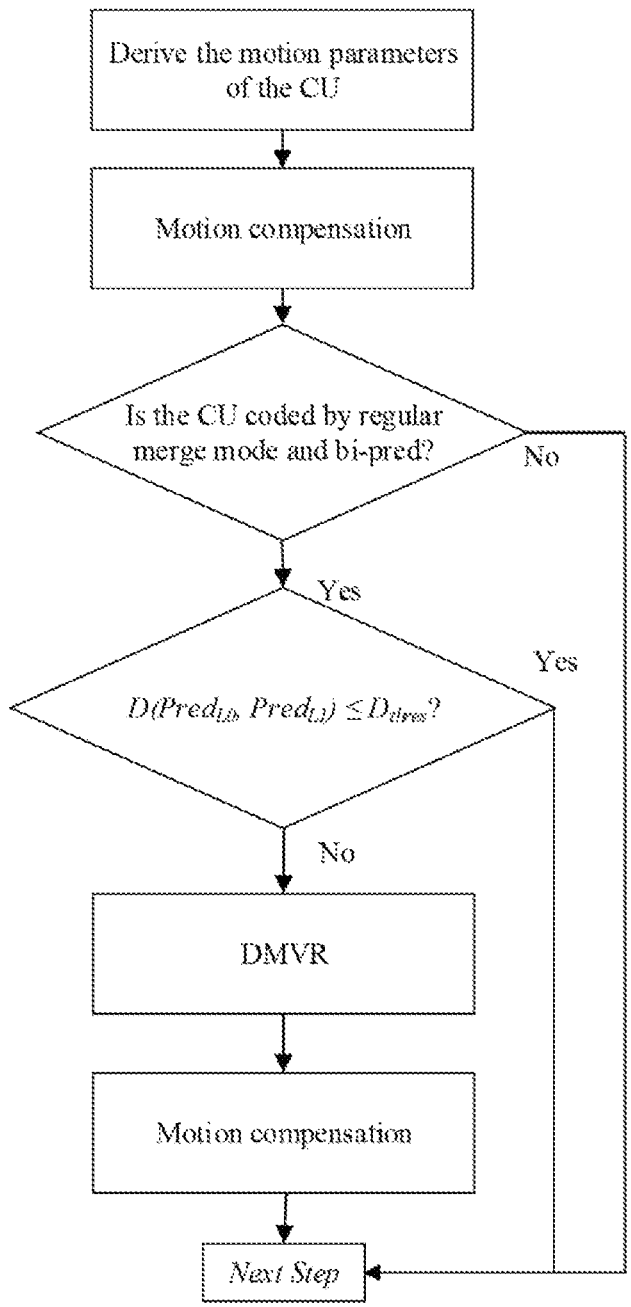
FIG. 9 shows a flowchart of an example motion compensation for the merge mode when DMVR early termination is applied.

Early termination of DMVR based on the similarity of prediction blocks may be performed. DMVR may be performed for CUs that are coded using the regular merge candidates (e.g., spatial candidates and/or the TMVP candidate). When the motion parameters provided by the regular merge candidate are accurate, DMVR may be skipped without coding loss. To determine whether the regular merge candidates can provide accurate motion estimation for the current CU, the average difference between two prediction blocks may be calculated, e.g., $$Diff = \frac{1}{N} \cdot \sum_{(x,y) \in B} D(I^{(0)}(x, y), I^{(1)}(x, y)) \qquad (3)$$

where $I^{(0)}(x, y)$ and $I^{(1)}(x, y)$ may be the sample values at the coordinate (x, y) of the L0 and L1 motion-compensated blocks generated using the motion information of a merge candidate; B and N may be the set of the sample coordinates and the number of samples as defined within the current CU, respectively; D may be the distortion measurement (e.g., sum of square error (SSE), sum of absolute difference (SAD), and/or sum of absolute transformed difference (SATD)). Given Equation (3), DMVR may be skipped, for example, if the difference measurement between two prediction signals is no larger than a pre-defined threshold (e.g., $Diff \leq D_{thres}$). If the difference measurement between two prediction signals is larger than a pre-defined threshold, the prediction signals generated by the merge candidate may be less correlated, and/or DMVR may be applied. FIG. 9 illustrates an example motion compensation after an early termination is applied to DMVR.

Sub-CU-level motion derivation may be disabled (e.g., adaptively disabled), for example, based on prediction similarity. One or more (e.g., two) prediction signals using the MVs of the merge candidate may be available before DMVR is performed. The prediction signals may be used to determine if DMVR should be disabled.

Figure 10:
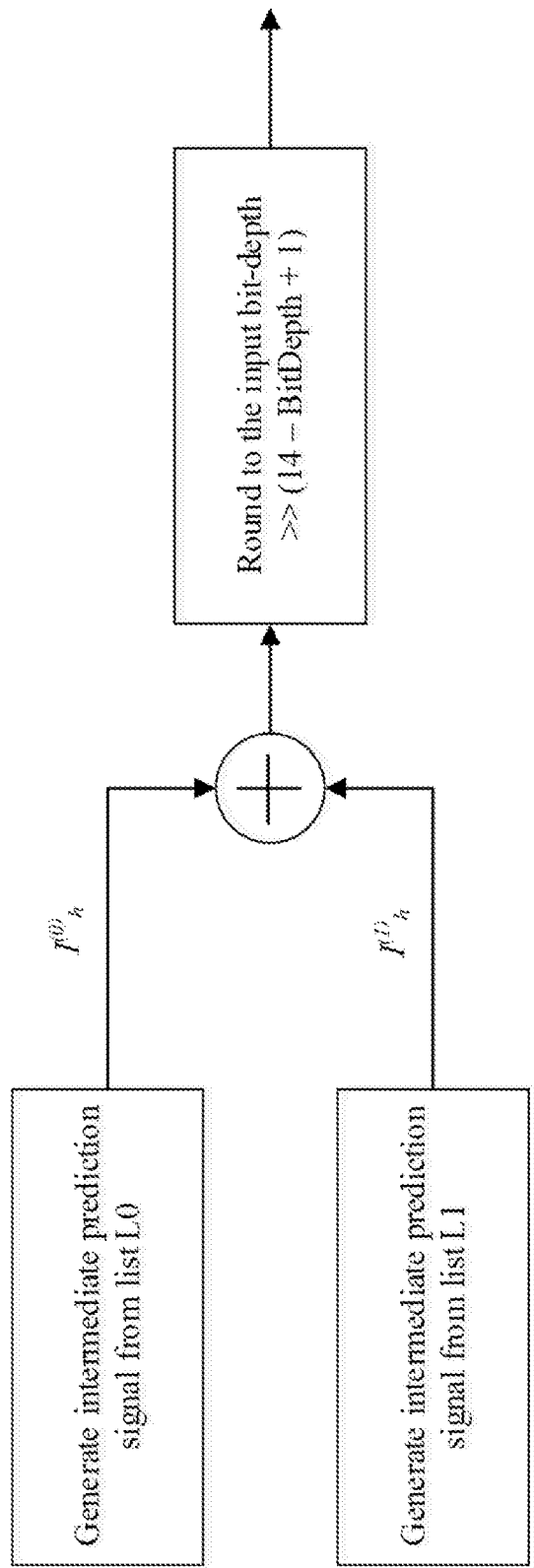
FIG. 10 shows an example bi-prediction where the average of two prediction signals is calculated at an intermediate bit-depth.

High precision prediction for DMVR may be performed. The prediction signal of a bi-predictive block may be generated, for example, by averaging prediction signals from the L0 and L1 at the precision of the input bit-depth. If the MVs point to fractional sample positions, the prediction signals may be obtained, for example, using interpolation at an intermediate precision (e.g., which may be higher than the input bit-depth due to the interpolation operation). The intermediate prediction signals may be rounded to the input bit-depth prior to the average operation. The input signals to the average operation may be shifted to a lower precision, for example, which may introduce rounding errors into the generated bi-prediction signal. The two prediction signals at the input bit-depth may be averaged at the intermediate precision, for example, if fractional MVs are used for a block. If the MVs correspond to fractional sample positions, the interpolation filtering may not round the intermediate value to the input bit-depth and may keep the intermediate value at a high precision (e.g., the intermediate bit-depth). In the case where one of two MVs is an integer motion (e.g., the corresponding prediction is generated without applying interpolation), the precision of the corresponding prediction may be increased to the intermediate bit-depth before the averaging is applied. For example, the precisions of two prediction signals may be the same. FIG. 10 illustrates an example bi-prediction when averaging the two intermediate prediction signals at high precision, where $I_h^{(0)}$ and $I_h^{(1)}$ may refer to the two prediction signals obtained from the list L0 and L1 at the intermediate bit-depth (e.g., 14-bit), and BitDepth may indicate the bit-depth of the input video.

In DMVR, the bi-prediction signals (e.g., $I^{(0)}(x, y)$ and $I^{(1)}(x, y)$) that may be used for the DMVR-based motion search may be defined at the precision of the input signal bit-depth. The input signal bit-depth may be, for example, 8-bit (e.g., if the input signal is 8-bit) or 10-bit (e.g., if the input signal is 10-bit). The prediction signals may be converted to low precision, for example, before the motion refinement. Rounding errors may be introduced when measuring the distortion cost. The conversion of the prediction signals from the intermediate bit-depth to the input bit-depth may involve one or more rounding and/or clipping operations. The DMVR-based motion refinement may be performed using the prediction signals that may be generated at the high bit-depth (e.g., $I_h^{(0)}$ and $I_h^{(1)}$ at the intermediate bit-depth in FIG. 10). The corresponding distortion between the two prediction blocks in Equation (3) may be calculated at the high precision as follows:

$$Diff_h = \frac{1}{N} \cdot \sum_{(x,y) \in B} D(I_h^{(0)}(x, y), I_h^{(1)}(x, y)) \qquad (4)$$

where $I_h^{(0)}(x, y)$ and $I_h^{(1)}(x, y)$ may be the high precision samples at the coordinate (x, y) of the prediction blocks generated from L0 and L1, respectively. $Diff_h$ may represent the corresponding distortion measurement as calculated at the intermediate bit-depth. Due to the increased bit-depth, the threshold (e.g., the distortion measurement threshold) that may be used to early terminate DMVR may be adjusted such that the threshold is defined at the same bit-depth as the prediction signals. If the L1 norm distortion (e.g., SAD) is used, the following equation may be used to adjust the distortion threshold from the input bit-depth to the intermediate bit-depth:

$$D_{thres}^h = D_{thres} << (14 - BitDepth) \qquad (5)$$

Advanced temporal motion vector prediction (ATMVP) may be derived. A collocated picture and a collocated block may be selected for ATMVP. Motion vectors from spatial neighboring CUs may be added to candidate list (e.g., a list of potential candidate neighboring CUs). For example, motion vectors from spatial neighboring CUs may be added if a neighboring CU is available and the MV of the neighboring CU is different from one or more MVs in an existing candidate list. For example, as shown in FIG. 4, the MVs from the neighboring blocks may be added in the order of $A_1$, $B_1$, $B_0$, and $A_0$. The number of available spatial candidates may be denoted as $N_0$. ATMVP may be derived using $N_0$ MVs.

No may be greater than 0. If No is greater than 0, an MV (e.g., the first available MV) may be used to determine the collocated picture and/or the offset to fetch the motion. As shown in FIG. 5, the first available MV may be from neighboring CU A. The collocated picture for ATMVP may be the reference picture associated with the MV from CU A. The offset to fetch the motion field may be derived from the MV. No may be equal to 0. If No is equal to 0, the collocated picture may be set to the collocated picture signaled in the slice header and the offset to fetch the motion field may be set to 0.

The collocated picture for ATMVP derivation of different CUs may be different, for example, if multiple reference pictures are used. For example, the collocated picture for ATMVP derivation of different CUs may be different if multiple reference pictures are used because the determination of the collocated picture may depend on their neighboring CUs. For current picture decoding, the collocated picture for ATMVP may not be fixed and ATMVP may refer to multiple reference pictures' motion field. The collocated picture for a current picture decoding may be set to a (e.g., one) reference picture, for example, that may be signaled at the slice header. The collocated picture may be identified. The reference picture of neighboring CU A may be different from the collocated picture. The reference picture of CU A may be denoted as RA, the collocated picture may be denoted as Ro, and the current picture may be denoted as P. POC(x) may be used to indicate the POC of picture x. The MV of CU A may be scaled from picture RA to the collocated picture as calculated in Equation (6), for example, to obtain a prediction for the offset position.

$$MV_{col}=MV(A)*(POC(R_{col})-POC(P))/(POC(R_A)-POC(P)) \qquad (6)$$

The scaled $MV_{col}$ may be used as an offset, for example, to fetch the motion field in the collocated picture Ro. The scaling in Equation (6) may be based on the picture temporal distance. For example, the first available MV from spatial CUs may be selected for scaling. An MV that may minimize a scaling error may be selected. An MV (e.g., the best MV) to be scaled may be selected from one or more (e.g., two) directions (e.g., list L0, list L1) of No MVs, for example, to minimize the scaling error. For example, a (e.g., each) neighboring block (e.g., neighboring CU) of the neighboring blocks may have a corresponding reference picture. A neighboring block may be selected to be the candidate neighboring block (e.g., candidate neighboring CU) based on a difference between the reference picture of the neighboring block and the collocated picture. The neighboring block selected to be the candidate neighboring block may have the smallest temporal distance between its reference picture and the collocated picture. For example, the reference picture (e.g., each reference picture) and the collocated picture may have picture order counts (POCs), and the candidate neighboring block may be selected based on a difference (e.g., having the lowest difference) between the POC of the reference picture and a POC of the collocated picture. An MV (e.g., a collocated MV) may be identified from the collocated picture based on an MV (e.g., a reference MV) from the reference picture. The neighboring CU may have a reference picture that is the same as the collocated picture, and the neighboring CU may be selected upon determining that the reference picture and the collocated picture are the same (e.g., without consideration of other neighboring CUs). The MV from the reference picture may be a spatial MV and the MV from the collocated picture may be a temporal MV.

The MV from the reference picture may be scaled, for example if the reference picture is not the same as the collocated picture. For example, the MV from the reference picture may be multiplied by a scaling factor. The scaling factor may be based on a temporal difference between the reference picture and the collocated picture. The scaling factor may be defined as $((POC(R_{col})-POC(P))/(POC(R_A)-POC(P))$. A scaling factor may have a value that denotes no scaling (e.g., 1). The scaling factor having the value that denotes no scaling may indicate that $R_A$ and $R_{col}$ are the same picture. A scaling error may be measured in one or more of the following ways. For example, the scaling error may be measured as provided in Equation (7) and/or as provided in Equation (8). The absolute difference between the scale factor for the given MV and scale factor value that denotes no scaling may be measured, for example, as provided in Equation (7).

$$ScaleError=abs((POC(R_{col})-POC(R_A))/(POC(R_A)-POC(P)) \qquad (7)$$

The absolute difference between the reference picture of the given MV and the collocated picture may be measured, as provided in Equation (8).

$$ScaleError=abs((POC(R_{col})-POC(R_A))) \qquad (8)$$

The best MV search may be terminated. For example, the search may terminate (e.g., terminate early) if ScaleError is equal to 0 for a certain MV during the search of an MV candidate to be scaled.

A neighboring MV may be used for matching a motion field of a collocated picture for ATMVP derivation. The neighboring MV may be selected, for example by minimizing precision loss caused by MV scaling. This may improve the precision of the scaled MV. The existence of valid motion information in a reference block may be indicated by the selected neighboring MV in the collocated picture. For example, when the reference block is an (e.g., one) intra block, ATMVP may be considered as unavailable, for example because there is no motion information associated with the reference block.

The best neighboring MV may be selected from the neighboring MVs that point to respective inter-coded block(s) in the collocated picture. MV scaling error may be minimized. A constraint may be imposed, e.g. to ensure that the selected neighboring MV points to an (e.g., one) inter-coded block in a collocated picture when determining a best neighboring MV (e.g., as shown in Equations (7) and (8)). Selection of a best neighboring MV may be formulated as provided in Equation (9).

$$N^* = \underset{N\in\{S|inter(ColPic(x+mv_N^x,y+mv_N^y))\}}{\operatorname{argmin}} ScaleError(N) \qquad (9)$$

(x, y) may be the center position of a current CU. ColPic(x, y) may indicate a block at position (x, y) inside the collocated picture. inter( ) may represent an indicator function that may indicate whether the input block is an inter block. S may indicate a set of available spatial neighboring blocks, e.g., S={$A_1$, $B_1$, $B_0$, $A_0$}. ScaleError may indicate MV scaling error as calculated in Equations (7) and (8). ($mv_N^x$, $mv_N^y$) may be a scaled motion vector of a neighboring block N. N* may represent a selected spatial neighbor whose MV is used for deriving a motion field of the current CU, e.g. based on ATMVP. In an example, a current block may have 3 spatial neighbors A, B, and C, with increasing scaling error (e.g., ScaleError(A)<ScaleError(B)<ScaleError(C)). If inter (ColPic(x+$mv_A^x$, y+$mv_A^y$)) is false (e.g., after scaling, block A's motion identifies an intra-coded reference block in the collocated picture), then block B's motion (e.g., whose scaling error is the second smallest) may be used to identify the reference block in the collocated picture. If B's scaled motion identifies an intra-coded reference block, then block C's motion may be used to identify the reference block in the collocated picture.

Figure 11:
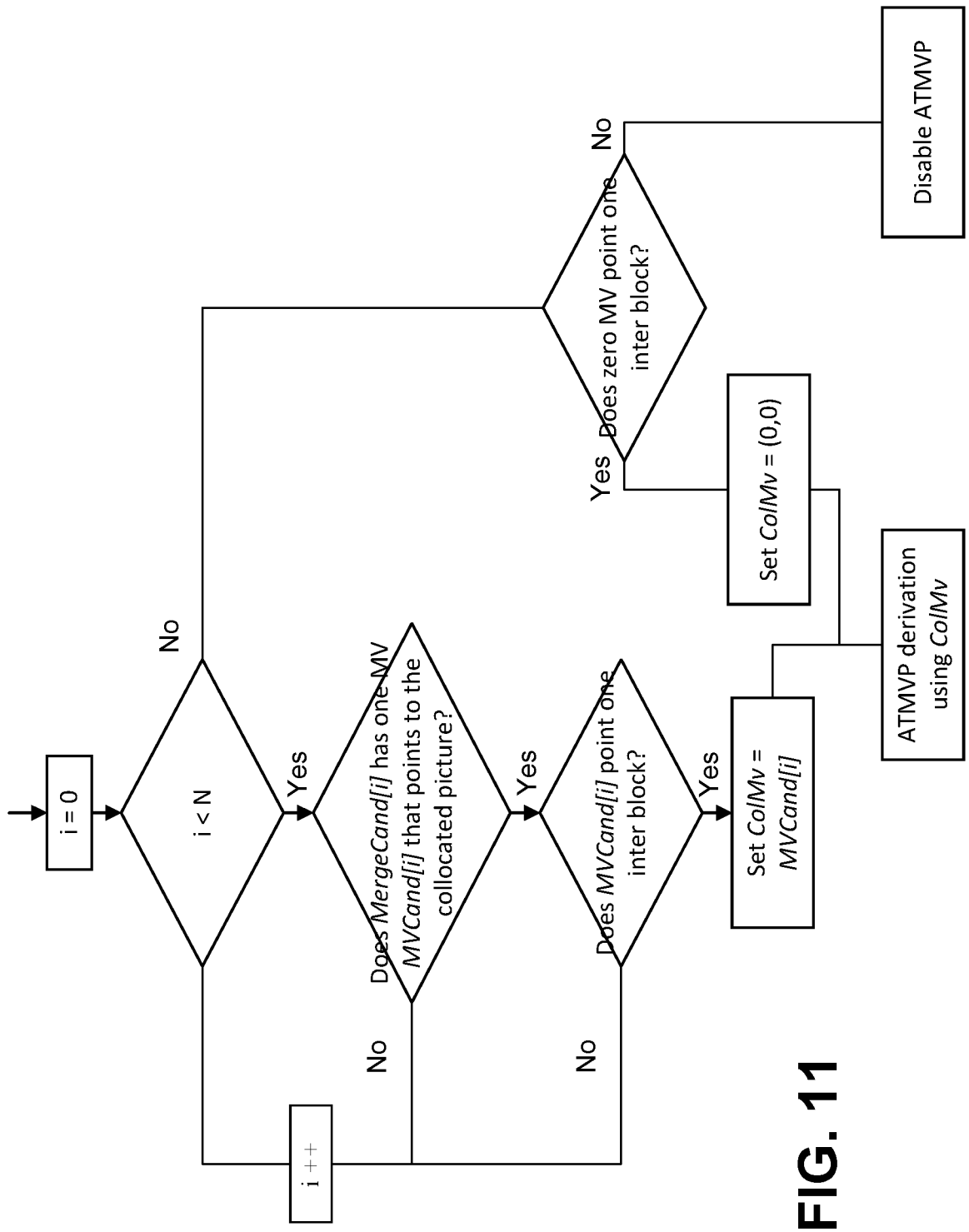
FIG. 11 shows an example of collocated block derivation for ATMVP.

MV scaling error, e.g. as indicated in Equation (7), may be used as a criterion to identify a best neighboring block, e.g. as shown in Equation (9). The motion of the best neighboring block may be used to choose a collocated block from the collocated picture. Calculation of MV scaling error, e.g. as indicated in Equation (7), may involve, for example, two subtractions, one division, and one absolute operation. Division may be implemented by multiplication and/or right shifts (e.g., based on a LUT). The best spatial neighboring block of a current CU may be selected to determine a collocated block for ATMVP. A collocated picture may be signaled at the slice and/or picture level. The collocated picture may be used for ATMVP derivation. The MVs of existing merge candidates may be examined in order (e.g., $A_1$, $B_1$, $B_0$, and $A_0$ as shown in FIG. 4). The MV of the first merge candidate that is associated with the collocated picture and identifies a (e.g., one) block that is coded by inter prediction may be selected to fetch the collocated block from the collocated picture. Zero motion may be selected, e.g. if no such candidate exists. ATMVP may be enabled, for example if the selected MV points to a (e.g., one) collocated block that is inter coded. ATMVP may be disabled, for example if the selected MV points to a (e.g., one) collocated block that is intra coded. FIG. 11 shows an example flowchart illustrating collocated block derivation as described herein.

Figure 14:
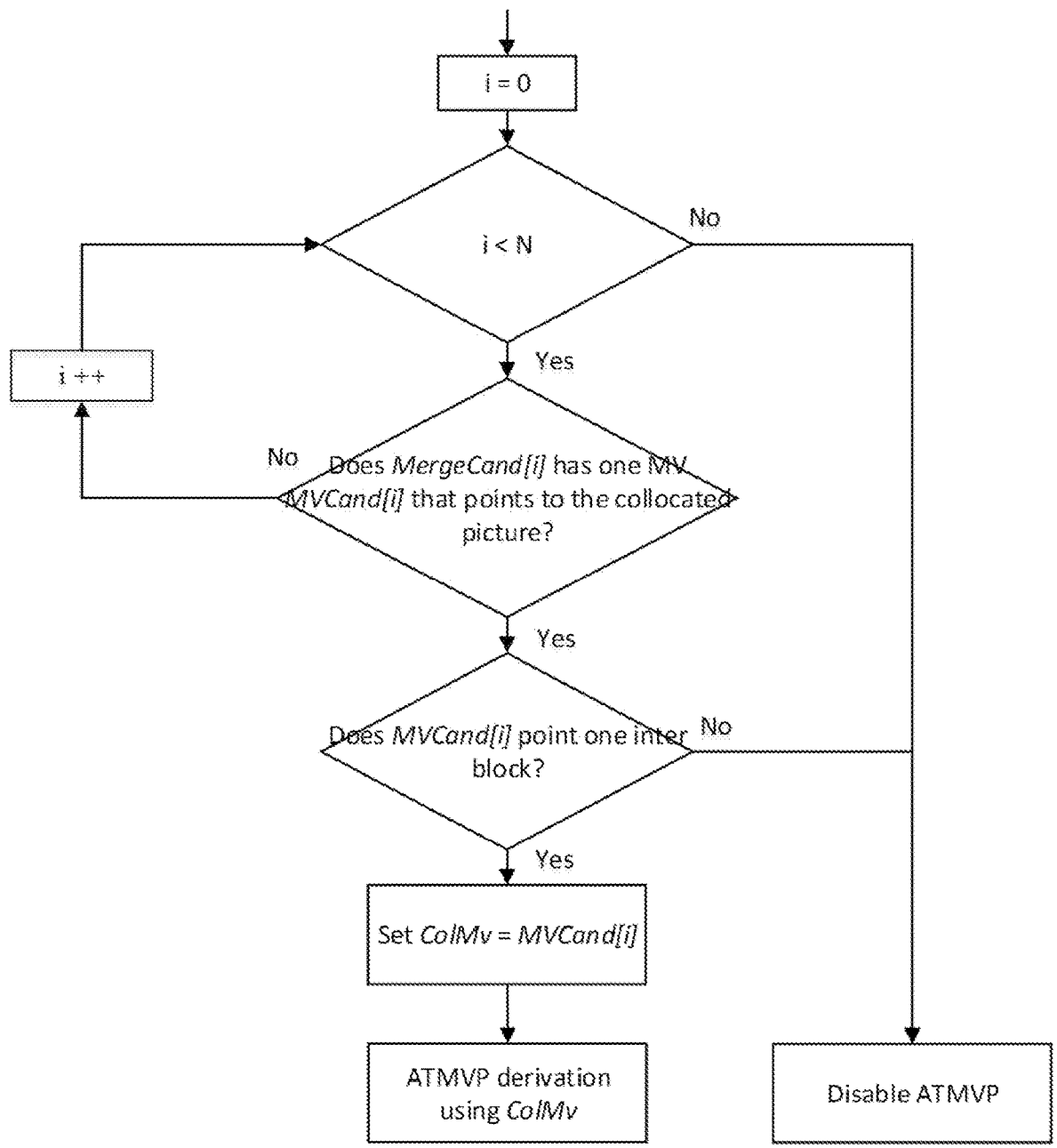
FIG. 14 shows an example of collocated block derivation for ATMVP.

MVs of existing merge candidates may be examined in order. For example, with reference to FIG. 4, the order may be $A_1$, $B_1$, $B_0$, and $A_0$. The MV of the first merge candidate that is associated with the collocated picture may be selected to fetch the collocated block from the collocated picture. ATMVP may be enabled based on the coding mode of the collocated block. For example, ATMVP may be disabled if the collocated block is intra coded, e.g. because the collocated block may not provide motion information. ATMVP may be disabled if, for example, none of the merge candidates are associated with the collocated picture. Early termination of checking may occur. For example, the checking may be terminated as soon as a first merge candidate associated with the collocated picture is found. FIG. 14 shows a flowchart illustrating derivation of a collocated block for ATMVP using checking of merge candidates.

Zero motion may be used to fetch a collocated block in a collocated picture. A block that is located at the same position of the current CU in a collocated picture may be checked to determine whether to enable ATMVP. ATMVP may be enabled, for example if the block is inter coded. ATMVP may be disabled, for example if the block is intra coded.

Figure 12:
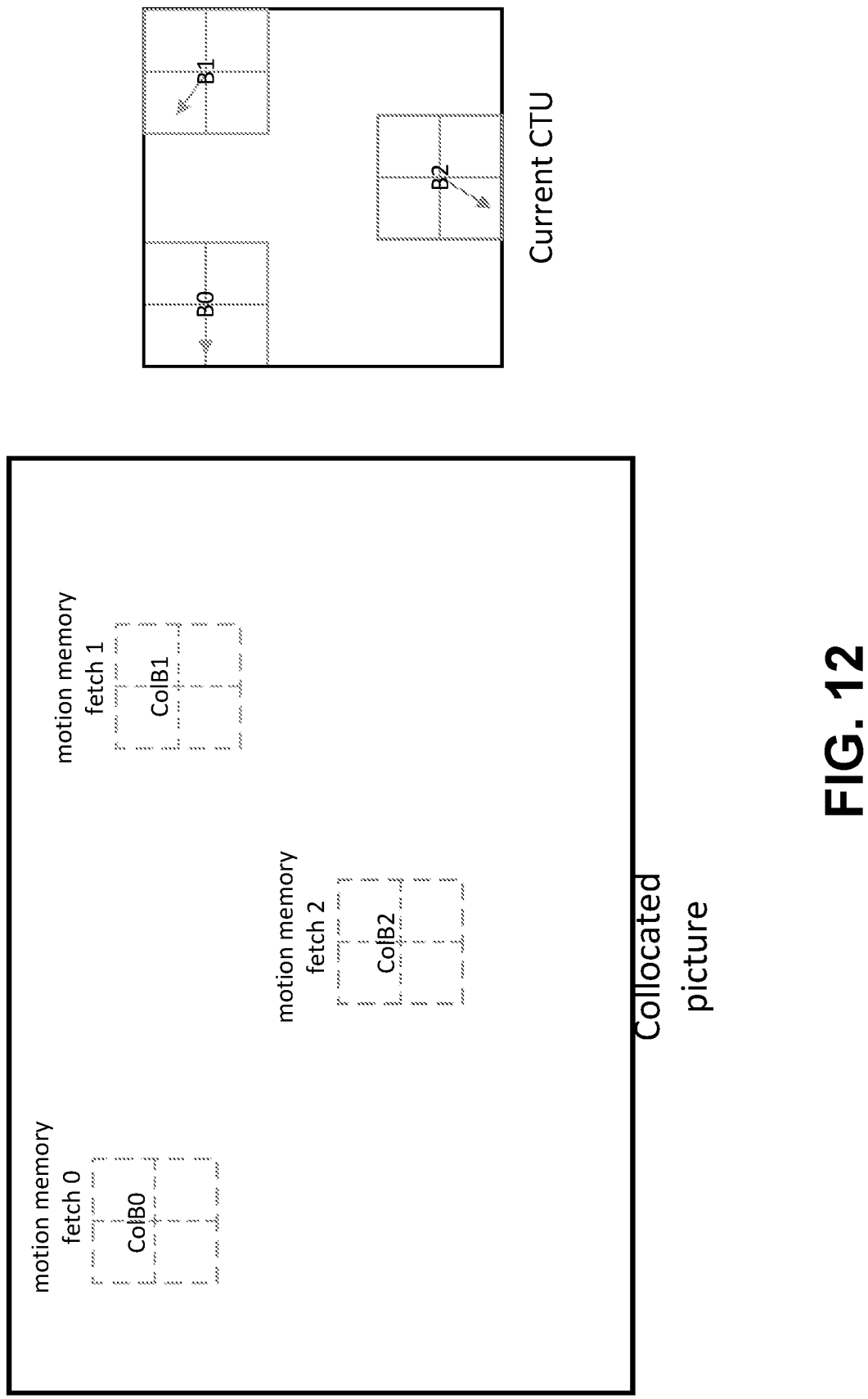
FIG. 12 shows unconstrained access of collocated blocks for ATMVP.

An area for fetching a collocated block for an ATMVP may be constrained. The collocated picture for ATMVP derivation for different ATMVP blocks may be constrained to a (e.g., one) reference picture. The corresponding collocated blocks may be indicated by MV of selected merge candidates of neighboring blocks. The corresponding collocated blocks may be far away from each other. An encoder or decoder may (e.g., frequently) switch between accessing motions (e.g., MVs and/or reference picture indices) of different regions in the collocated picture. FIG. 12 shows an example of unconstrained access of collocated blocks for ATMVP. As shown in FIG. 12, there may be one or more (e.g., three) ATMVP CUs in a current CTU, with CUs (e.g., each CU) using a motion offset (e.g., a distinctive motion offset), e.g. as indicated in FIG. 12 by different colors. The offset may be used to locate a corresponding collocated block in the collocated picture, e.g. as indicated by the dashed blocks in FIG. 12. Collocated blocks may be located in different regions of a collocated picture, e.g. due to the motion offsets having different values.

Figure 13:
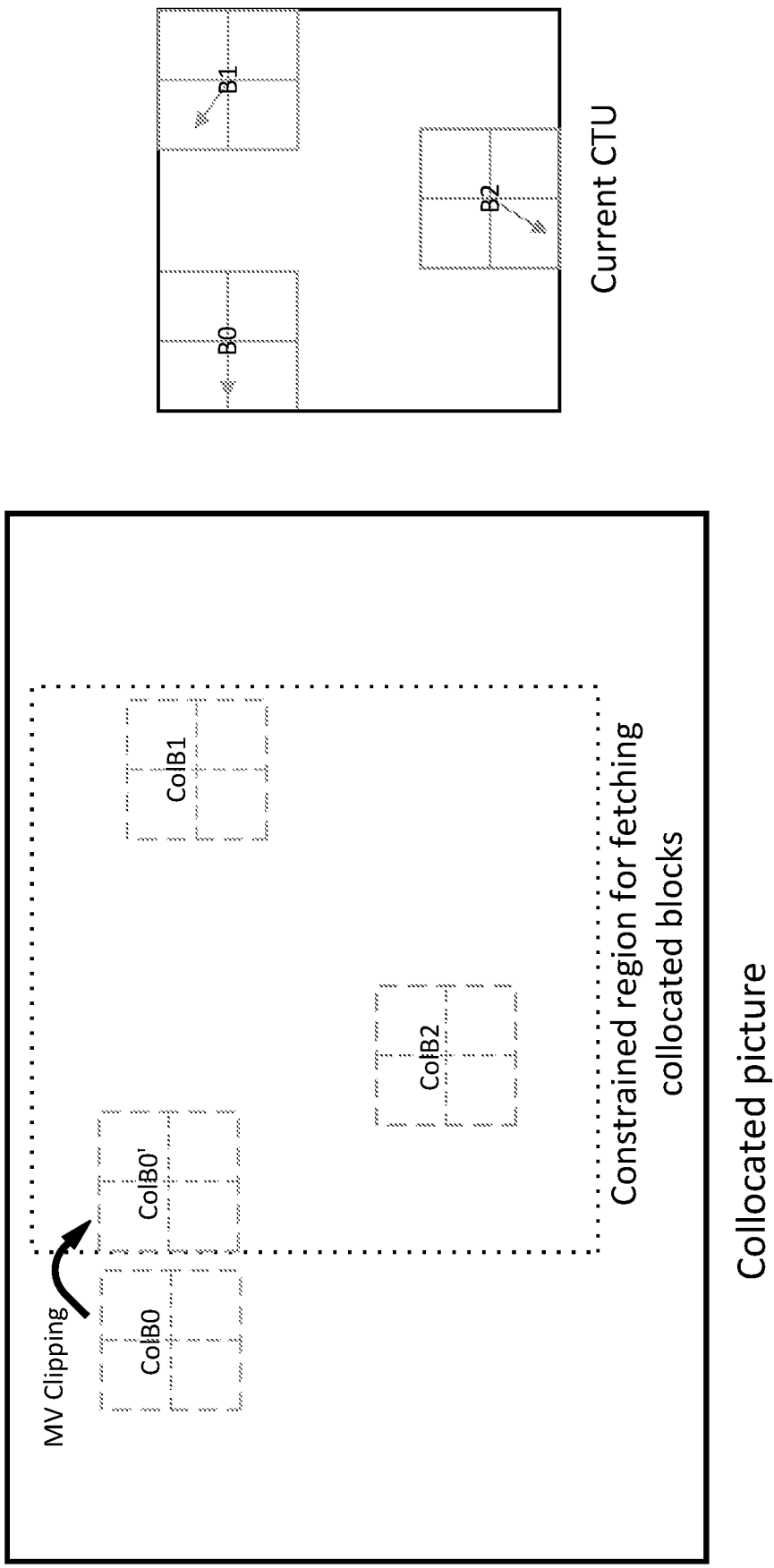
FIG. 13 shows a constrained region for deriving a collocated block for an ATMVP coding unit.

A collocated block of an ATMVP CU (e.g., each ATMVP CU) may be derived within a (e.g., one) constrained range. FIG. 13 shows an example of applying a constrained region to derive collocated blocks for ATMVP. FIG. 13 may show the same collocated picture and CTU as FIG. 12. As shown in FIG. 13, given the position of a current CU, a constrained area (e.g., a region) in the collocated picture may be determined. For example, the constrained area may be determined based on the current slice. The position of the collocated block that is used for ATMVP derivation of the current CU may be within the area. The collocated blocks within the area may be valid collocated blocks. An MV from a neighboring block (e.g., a candidate neighboring block) that is not within the area may be replaced with an MV from a valid collocated block. For example, as shown in FIG. 13, the original collocated blocks of B1 and B2 (e.g., ColB1 and ColB2) may be inside the constrained area. The original collocated blocks ColB1 and ColB2 may be used for ATMVP derivations of B1 and B2. Because the original collocated block of B0 (e.g., ColB0) is outside of the constrained area, a (e.g., one) collocated block (e.g., ColB0') may be generated by clipping the position of ColB0 towards the closest boundary of the constrained area. For example, ColB0' may be the closest valid block to ColB0. The position of ColB0' may be set as the block located at the same location as the current block in the collocated picture (e.g., the motion of B0 may be set to zero). An MV from ColB0' may be used (e.g., instead of the MV from ColB0) to code (e.g., encode and/or decode) the CU. ATMVP may be disabled, for example when ColB0 is out of bounds.

A size of a constrained area for collocated block derivation of ATMVP may be determined. For example, a (e.g., one) fixed area may be applied to CUs (e.g., all CUs) that are coded by ATMVP in a (e.g., one) video sequence. Derivation of a collocated block of an (e.g., one) ATMVP CU of a current CTU (e.g., a CTU that contains a current CU) may be constrained to be within the same area of a collocated CTU inside the collocated picture. For example, (e.g., only) a collocated block within a CTU in a collocated picture that is positioned at the same location as the current CTU may be derived. Derivation of a collocated block for a TMVP process of a (e.g., one) CU may be constrained to be within a current CTU and a (e.g., one) column of 4×4 blocks. A CTU may contain W×H (e.g., width times height) samples. The region of deriving the collocated block of TMVP may be (W+4)×H. The same constrained area size (e.g., the current CTU plus a (e.g., one) column of 4×4 blocks) may be used to derive collocated blocks for both ATMVP and TMVP. The size of the constrained area may be selected and signaled from an encoder to a decoder. Syntax elements may be added at a sequence and/or picture or slice level. Different profiles and/or levels may be defined for various application requirements. For example, syntax elements may be signaled in the Sequence Parameter Set (SPS) and/or the Picture Parameter Set (PPS), or may be signaled in a slice header.

Selection of a collocated block for ATMVP and constraining of an area for collocated block derivation may be combined. For example, as shown in FIG. 14, the collocated block may be selected based on characteristics of one or more merge candidates. MVs of existing merge candidates may be examined in order (e.g., $A_1$, $B_1$, $B_0$, and $A_0$ as shown in FIG. 4). The MV of the first merge candidate that is associated with a collocated picture may be selected to fetch a collocated block from the collocated picture. ATMVP may be disabled, for example if the collocated block is intra coded or if none of the merge candidates are associated with the collocated picture. A valid merge candidate may be found. For example, the valid merge candidate may be A. The collocated block in the collocated picture corresponding to A may be denoted as ColA1. ColA1 may be out of the bounds of the constrained range. If ColA1 is out of the bounds of the constrained range, ColA1 may be clipped back to the closest boundary of the constrained area, set to be the block located at the same location as the current block in the collocated picture (e.g. the motion of $A_1$ may be set to zero), and/or ATMVP may be marked as disabled.

Figure 15:
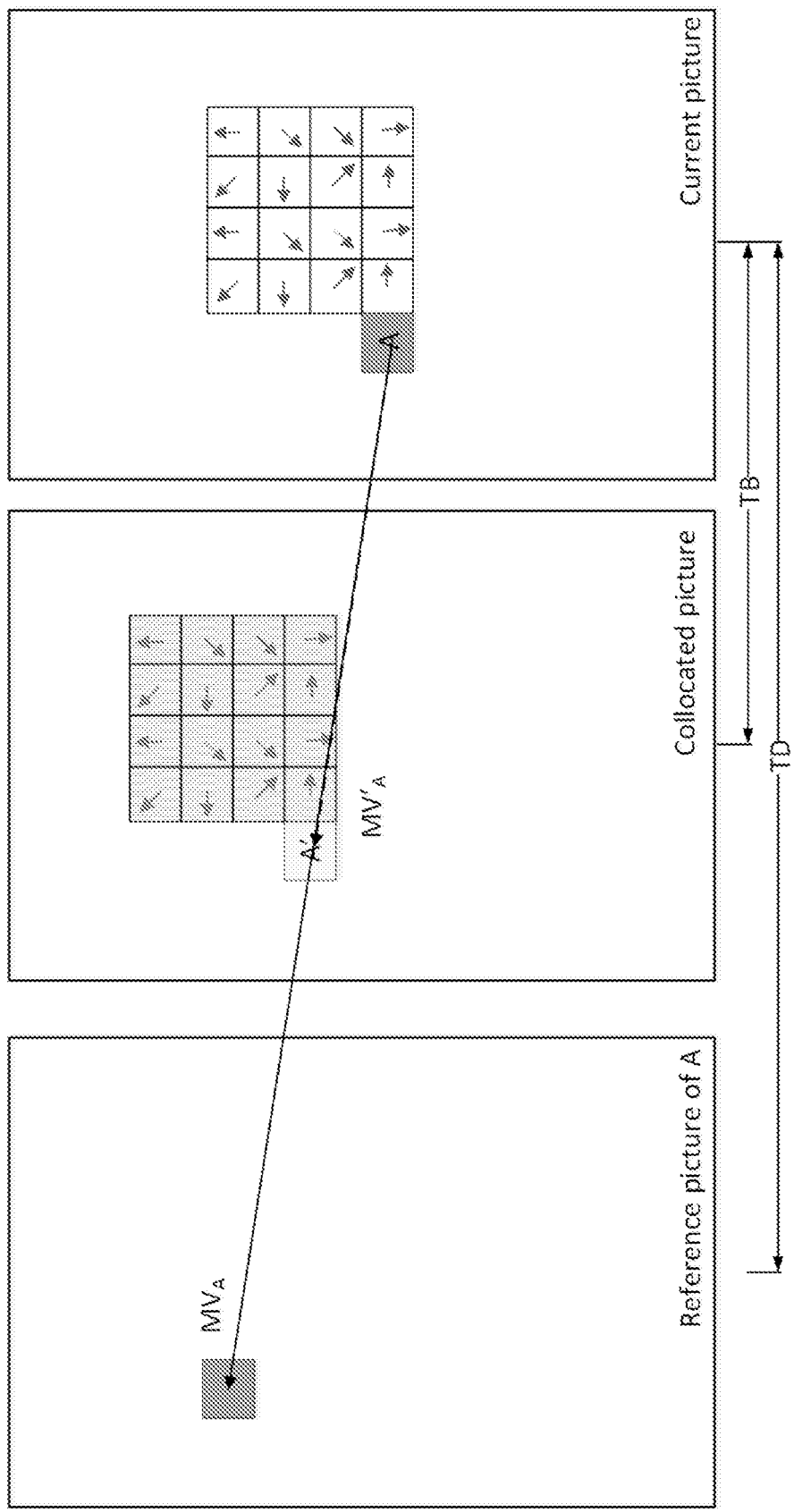
FIG. 15 shows an example of deriving an MV for a current block using a collocated picture.

FIG. 15 shows an example of deriving an MV for a current block using a collocated picture. A collocated picture for a current picture may be signaled, for example in a slice header. The collocated picture may be used in performing ATMVP on the current picture. For example, a reference picture for a neighboring block of a current block within the current picture may be compared to the collocated picture. A neighboring block may be selected based on the reference picture of the neighboring block having a lowest temporal distance to the collocated picture. A temporal distance may be a POC difference. The reference picture of the neighboring block may be the same as the collocated picture. An MV from the reference picture for the selected neighboring block may be used to determine an MV from the collocated picture. The MV from the collocated picture may be used to code the current block. The MV from the collocated picture may be scaled, for example if the reference picture of the selected neighboring block is not the same as the collocated picture.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding device, comprising:
   a processor configured to:
   identify a collocated picture for a current slice of a video, wherein the current slice comprises a current block and a neighboring block of the current block, the neighboring block being associated with a reference picture;
   determine a picture order count (POC) difference between the reference picture of the neighboring block and the collocated picture;
   determine a temporal motion vector (MV) for obtaining a collocated sub-block in the collocated picture based on the POC difference between the reference picture of the neighboring block and the collocated picture, wherein the temporal MV is a default value based on a condition that the POC difference indicates that the reference picture differs from the collocated picture;
   obtain the collocated sub-block in the collocated picture based on the temporal MV; and
   decode the current block based on the collocated sub-block in the collocated picture.

2. The video decoding device of claim 1, wherein the temporal MV is determined to be an MV of the neighboring block based on a condition that the POC difference indicates that the reference picture is the same as the collocated picture.

3. The video decoding device of claim 1, wherein the (POC) difference indicates a temporal distance between the reference picture of the neighboring block and the collocated picture.

4. The video decoding device of claim 1, wherein the collocated picture is identified based on a collocated picture indication in a slice header, and wherein the neighboring block is one of a plurality of neighboring blocks of the current block, and the neighboring block is selected based on respective POC differences between respective reference pictures of the neighboring blocks and the collocated picture.

5. The video decoding device of claim 1, wherein the neighboring block is one of a plurality of neighboring blocks of the current block, and the neighboring block is selected without considering the other neighboring blocks based on a determination that the reference picture of the neighboring block is the same as the collocated picture.

6. The video decoding device of claim 1, wherein the neighboring block is associated with a spatial MV.

7. The video decoding device of claim 1, wherein decoding the current block comprises performing temporal motion vector prediction (TMVP) using the collocated sub-block.

8. The video decoding device of claim 7, wherein the TMVP comprises temporal scaling of an MV of the collocated sub-block based on a first POC associated with a reference picture of the current slice, a second POC associated with the current slice, and a third POC associated with the collocated picture.

9. The video decoding device of claim 1, wherein the processor is further configured to:
   obtain an MV of the collocated sub-block; and
   generate a scaled MV of the collocated sub-block based on a first POC associated with a reference picture of the current slice, a second POC associated with the current slice, and a third POC associated with the collocated picture.

10. The video decoding device of claim 9, wherein the processor is further configured to:
    predict a sub-block of the current block using the scaled MV of the collocated sub-block, wherein the current block is decoded based on the predicted sub-block of the current block.

11. A method for decoding a video, the method comprising:
    identifying a collocated picture for a current slice of the video, wherein the current slice comprises a current block and a neighboring block of the current block, the neighboring block being associated with a reference picture;
    determining a picture order count (POC) difference between the reference picture of the neighboring block and the collocated picture;
    determining a temporal motion vector (MV) for obtaining a collocated sub-block in the collocated picture based on the POC difference between the reference picture of the neighboring block and the collocated picture, wherein the temporal MV is a default value based on a condition that the POC difference indicates that the reference picture differs from the collocated picture;

obtaining the collocated sub-block in the collocated picture based on the temporal MV; and decoding the current block based on the collocated sub-block in the collocated picture.

12. The method of claim 11, wherein the temporal MV is determined to be an MV of the neighboring block based on a condition that the POC difference indicates that the reference picture is the same as the collocated picture.

13. The method of claim 11, wherein the neighboring block is one of a plurality of neighboring blocks of the current block, and the neighboring block is selected based on respective POC differences between respective reference pictures of the neighboring blocks and the collocated picture.

14. The method of claim 11, wherein decoding the current block comprises performing temporal motion vector prediction (TMVP) using the collocated sub-block, and wherein the TMVP comprises temporal scaling of an MV of the collocated sub-block based on a first POC associated with a reference picture of the current slice, a second POC associated with the current slice, and a third POC associated with the collocated picture.

15. A video encoding device, comprising:
a processor configured to:
identify a collocated picture for a current slice of a video, wherein the current slice comprises a current block and a neighboring block of the current block, the neighboring block being associated with a reference picture;
determine a picture order count (POC) difference between the reference picture of the neighboring block and the collocated picture;
determine a temporal motion vector (MV) for obtaining a collocated sub-block in the collocated picture based on the POC difference between the reference picture of the neighboring block and the collocated picture, wherein the temporal MV is a default value based on a condition that the POC difference indicates that the reference picture differs from the collocated picture;
obtain the collocated sub-block in the collocated picture based on the temporal MV; and
encode the current block based on the collocated sub-block in the collocated picture.

16. The video encoding device of claim 15, wherein the temporal MV is determined to be an MV of the neighboring block based on a condition that the POC difference indicates that the reference picture is the same as the collocated picture.

17. The video encoding device of claim 15, wherein the processor is further configured to:
obtain an MV of the collocated sub-block; and
generate a scaled MV of the collocated sub-block based on a first POC associated with a reference picture of the current slice, a second POC associated with the current slice, and a third POC associated with the collocated picture.

18. A method for encoding a video, comprising:
identifying a collocated picture for a current slice of the video, wherein the current slice comprises a current block and a neighboring block of the current block, the neighboring block being associated with a reference picture;
determining a picture order count (POC) difference between the reference picture of the neighboring block and the collocated picture;
determining a temporal motion vector (MV) for obtaining a collocated sub-block in the collocated picture based on the POC difference between the reference picture of the neighboring block and the collocated picture, wherein the temporal MV is a default value based on a condition that the POC difference indicates that the reference picture differs from the collocated picture;
obtaining the collocated sub-block in the collocated picture based on the temporal MV; and
encoding the current block based on the collocated sub-block in the collocated picture.

19. The method of claim 18, wherein the temporal MV is determined to be an MV of the neighboring block based on a condition that the POC difference indicates that the reference picture is the same as the collocated picture.

20. The method of claim 18, further comprising:
obtaining an MV of the collocated sub-block; and
generating a scaled MV of the collocated sub-block based on a first POC associated with a reference picture of the current slice, a second POC associated with the current slice, and a third POC associated with the collocated picture.

* * * * *